(12) United States Patent
Yamamoto

(10) Patent No.: US 11,502,743 B2
(45) Date of Patent: Nov. 15, 2022

(54) RELAY DEVICE, INFORMATION PROCESSING SYSTEM, AND NON-TRANSITORY COMPUTER READABLE MEDIUM STORING RELAY PROCESSING PROGRAM

(71) Applicant: FUJIFILM Business Innovation Corp., Tokyo (JP)

(72) Inventor: Shinichiro Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 346 days.

(21) Appl. No.: 16/721,946

(22) Filed: Dec. 20, 2019

(65) Prior Publication Data

US 2020/0395998 A1    Dec. 17, 2020

(30) Foreign Application Priority Data

Jun. 17, 2019   (JP) .............................. JP2019-111666

(51) Int. Cl.
*H04B 7/14*          (2006.01)
*H04W 88/04*         (2009.01)
(Continued)

(52) U.S. Cl.
CPC ....... *H04B 7/15557* (2013.01); *H04B 5/0031* (2013.01); *H04L 63/0209* (2013.01); *H04W 76/34* (2018.02)

(58) Field of Classification Search
CPC .... H04B 7/15557; H04B 5/0031; H04B 7/14; H04B 7/15592; H04W 76/34;
(Continued)

(56) References Cited

U.S. PATENT DOCUMENTS 11,119,870 B2 *   9/2021   Okuno ................ G06F 11/1443
2006/0031929 A1 * 2/2006   Saito ..................... H04L 63/029
                                                            726/11
(Continued)

FOREIGN PATENT DOCUMENTS

JP           2003110751          4/2003

*Primary Examiner* — Andrew Wendell
(74) *Attorney, Agent, or Firm* — JCIPRNET

(57) ABSTRACT

A relay device includes a first communication unit that communicates with an information management apparatus connected to the Internet via a firewall, a second communication unit that performs near field communication with a terminal apparatus, a storage unit that acquires from the information management apparatus, using the first communication unit, information for identifying the terminal apparatus and mode instruction information that is instruction information indicating that an operation is to be performed in a second mode for acquiring data having a larger data amount than in a first mode, and stores the acquired information, and a control unit that in a case where the terminal apparatus connected using the second communication unit is a terminal apparatus that needs to operate in the second mode, performs control so as to transmit mode instruction information for instructing the operation in the second mode, to the terminal apparatus, and transmit data acquired from the terminal apparatus by using the second communication unit, to the information management apparatus by using the first communication unit.

19 Claims, 20 Drawing Sheets

(51) Int. Cl.
  *H04B 7/155* (2006.01)
  *H04L 9/40* (2022.01)
  *H04W 76/34* (2018.01)
  *H04B 5/00* (2006.01)

(58) Field of Classification Search
  CPC ....... H04W 76/15; H04W 4/80; H04W 88/04; H04L 63/0209; H04L 63/02
  See application file for complete search history.

(56) References Cited

U.S. PATENT DOCUMENTS

| | | | |
|---|---|---|---|
| 2010/0155469 A1* | 6/2010 | Ota | G06K 7/10297 235/375 |
| 2014/0323048 A1* | 10/2014 | Kang | H04W 4/80 455/41.2 |
| 2015/0244810 A1* | 8/2015 | Takatsuka | H04L 67/143 709/228 |
| 2016/0366292 A1* | 12/2016 | Anezaki | H04W 8/005 |
| 2019/0114894 A1* | 4/2019 | Irukayama | H04W 4/029 |
| 2019/0250839 A1* | 8/2019 | Bedadala | G06F 3/0605 |
| 2019/0268956 A1* | 8/2019 | Xiao | H04L 45/245 |

* cited by examiner

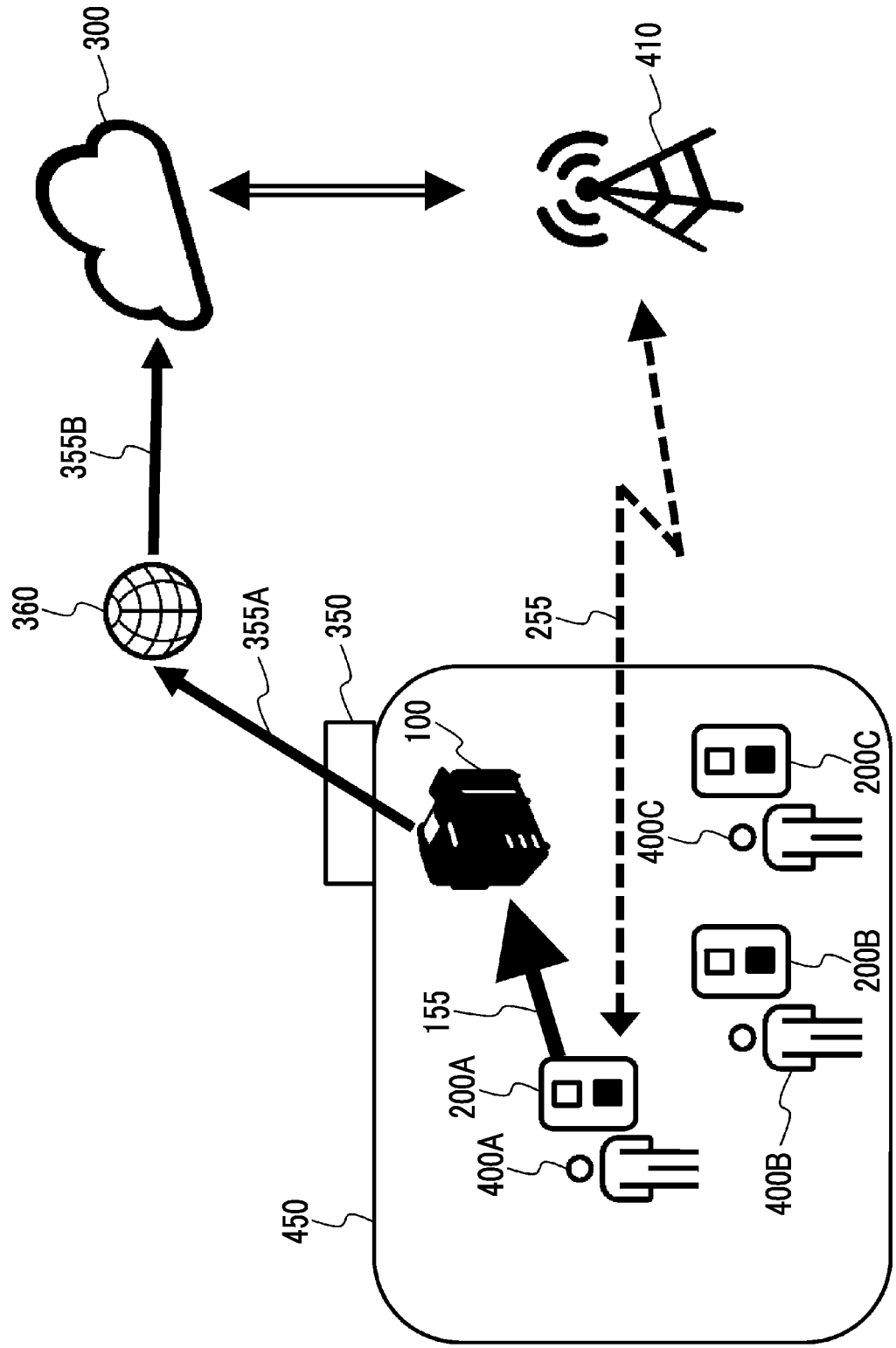

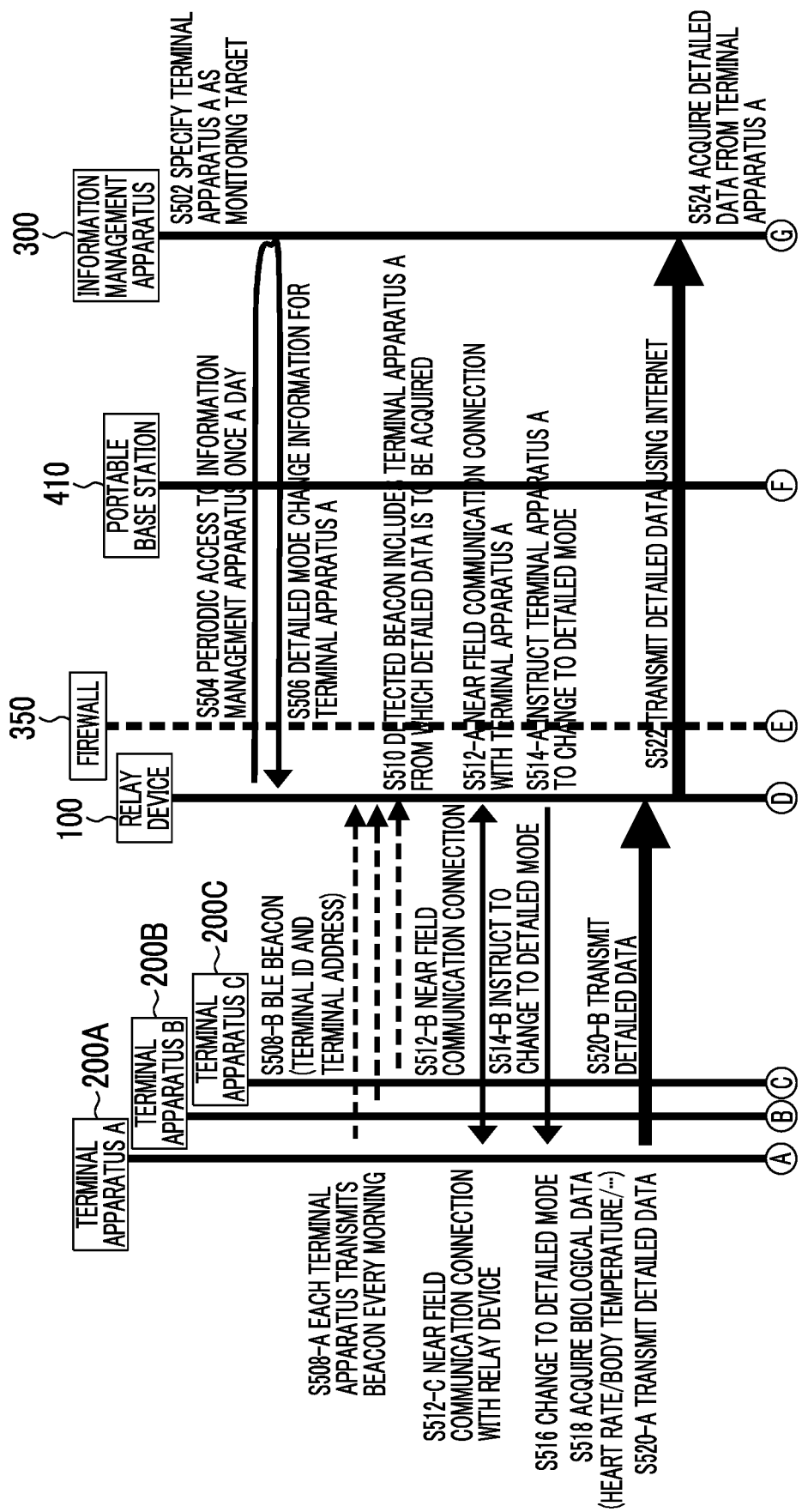

FIG. 6

| TERMINAL APPARATUS ID 605 | ACQUISITION DATE AND TIME 610 | MEASUREMENT DATA A 615 |
|---|---|---|
|  |  |  |

| USER ID 705 | TERMINAL APPARATUS ID 710 |
|---|---|
|  |  |

| USER ID 705 | TERMINAL APPARATUS NUMBER 755 | TERMINAL APPARATUS ID 760 | ... |
|---|---|---|---|
|  |  |  |  |

750

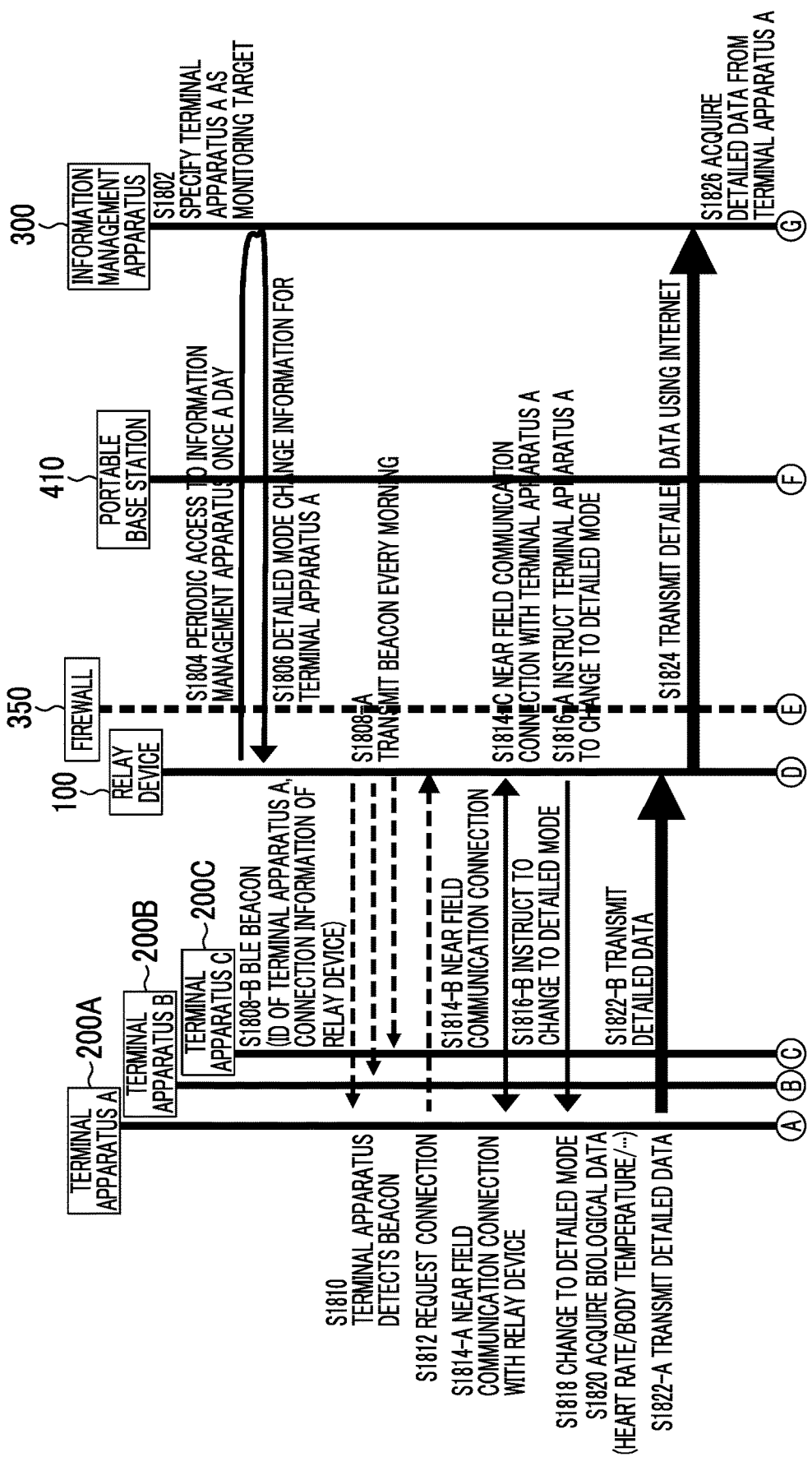

RELAY DEVICE, INFORMATION PROCESSING SYSTEM, AND NON-TRANSITORY COMPUTER READABLE MEDIUM STORING RELAY PROCESSING PROGRAM

CROSS-REFERENCE TO RELATED APPLICATIONS

This application is based on and claims priority under 35 USC 119 from Japanese Patent Application No. 2019-111666 filed Jun. 17, 2019.

BACKGROUND

(i) Technical Field

The present invention relates to a relay device, an information processing system, and a non-transitory computer readable medium storing a relay processing program.

(ii) Related Art

JP2003-110751A discloses that, for the purpose of providing a portable information device and a line switching method which have a wireless telephone function and realize low-cost, high-speed wireless communication, a mobile phone performs switching so as to selectively use one of a wireless telephone line or a wireless LAN line. It is possible to set the prohibition of reception of data sent through the wireless telephone line, or to set the wireless LAN line to be used preferentially in a case of data transmission. By using the wireless LAN line in a case of communication with information equipment on the company private line, communication cost can be reduced by the system on the company side, there are few types of media that are involved in data transfer, and a high transfer rate can be realized.

SUMMARY

In a case where the data acquired by the terminal apparatus is transmitted to the information management apparatus, and the data received and collected by the information processing apparatus is managed, the information management apparatus may want to adjust the amount of data collected, for the terminal apparatus. In a case where the terminal apparatus and the information management apparatus are connected to the Internet via a firewall, the firewall passes information on the response to the information acquisition request from the terminal apparatus to the information management apparatus, but blocks the information transmitted to the terminal apparatus by the information management apparatus voluntarily, so an instruction cannot be given from the information management apparatus to the terminal apparatus.

Aspects of non-limiting embodiments of the present disclosure relate to a relay device, an information processing system, and a non-transitory computer readable medium storing a relay processing program, capable of transmitting instruction information to a terminal apparatus for which an information management apparatus determines that a larger amount of data needs to be acquired, in a case of communicating with the information management apparatus connected to the Internet via a firewall, and performing near field communication with the terminal apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The gist of the present invention for achieving the object lies in the following inventions.

According to an aspect of the present disclosure, there is provided a relay device including a first communication unit that communicates with an information management apparatus connected to the Internet via a firewall; a second communication unit that performs near field communication with a terminal apparatus; a storage unit that acquires from the information management apparatus, using the first communication unit, information for identifying the terminal apparatus and mode instruction information that is instruction information indicating that an operation is to be performed in a second mode for acquiring data having a larger data amount than in a first mode, and stores the acquired information; and a control unit that in a case where the terminal apparatus connected using the second communication unit is a terminal apparatus that needs to operate in the second mode, performs control so as to transmit, mode instruction information for instructing the operation in the second mode, to the terminal apparatus, and transmit data acquired from the terminal apparatus by using the second communication unit, to the information management apparatus by using the first communication unit.

BRIEF DESCRIPTION OF THE DRAWINGS

Exemplary embodiment(s) of the present invention will be described in detail based on the following figures, wherein:

FIG. 4 is a diagram illustrating a system configuration example using the present exemplary embodiment;

FIGS. 5A and 5B are flowcharts illustrating a process example (1) according to the present exemplary embodiment;

FIG. 6 is a diagram illustrating a data structure example of transmission data;

FIGS. 7A and 7B are explanatory diagrams showing a data structure example of a user-terminal apparatus correspondence table;

FIGS. 18A and 18B are flowcharts illustrating a process example (2) according to the present exemplary embodiment;

DETAILED DESCRIPTION

Hereinafter, with reference to the drawings, a description will be made of an exemplary embodiment for realizing the invention.

Figure 1:
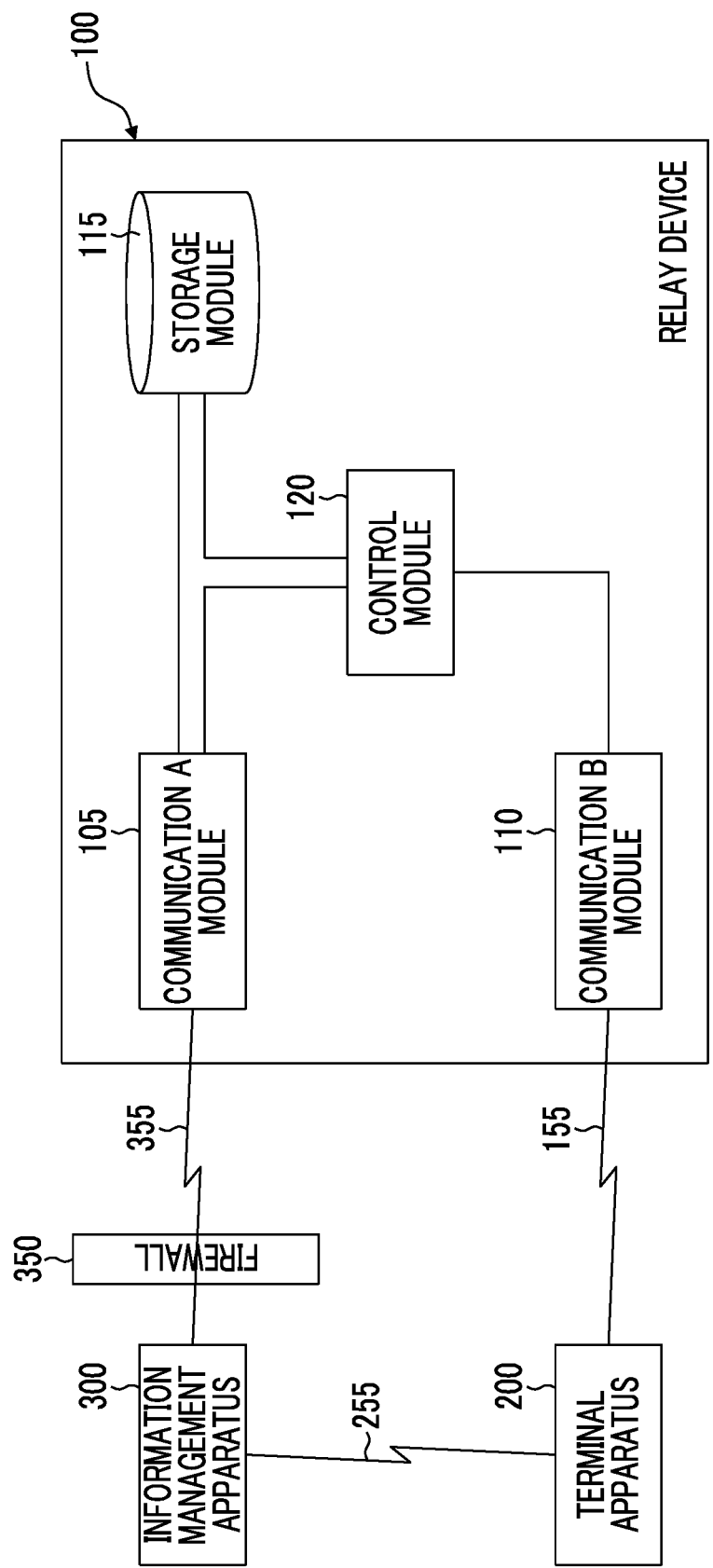
FIG. 1 is a conceptual module configuration diagram for a configuration example of a relay device which is the present exemplary embodiment.

FIG. 1 shows a conceptual module configuration diagram for a configuration example of a relay device 100 which is the present exemplary embodiment.

The module generally indicates components such as software (including a computer program as an interpretation of "software") or hardware which may be logically divided. Therefore, the module in the present exemplary embodiment indicates not only a module in a computer program but also a module in a hardware configuration. Therefore, in the present exemplary embodiment, a description will also be made of a computer program (for example, a program causing a computer to execute each procedure, a program causing a computer to function as each means, or a program a computer to realize each function), a system, and a method for functioning as such a module. However, for convenience of description, "storing", "being stored", or words equivalent thereto are used, but, these words indicate that a storage device stores data or a storage device is controlled to store data in a case where an exemplary embodiment is a computer program. A module may correspond to a function on a one-to-one basis, and, in installation, a single module may be configured with a single program, a plurality of modules may be configured with a single program, and, conversely, a single module may be configured with a plurality of programs. The plurality of modules may be executed by a single computer, and a single module may be executed by a plurality of computers in a distributed or parallel environment. Other modules may be included in a single module. Hereinafter, the term "connection" indicates not only physical connection but also logical connection (for example, transmission and reception of data, an instruction, a reference relationship between pieces of data, login, and the like). The term "being predetermined" indicates that setting is performed prior to a target process, and indicates not only that setting is performed before a process according to the present exemplary embodiment is started but also that, even after a process according to the present exemplary embodiment is started, setting is performed depending on a situation or a state at the time or a situation or a state hitherto in a case where a target process is not performed. In a case where there are "a plurality of predetermined values", the values may be different from each other, and two or more values may be the same as each other ("two or more values", of course, include all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless otherwise mentioned, and a case where only one thereof (for example, only A) is selected is included.

A system or an apparatus also includes not only a case where a plurality of computers, pieces of hardware, and apparatuses are configured to be connected to each other via communication means such as a network ("network" includes communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (that is, social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk drive, a random access memory (RAM, for short), an external storage medium, a storage device connected via a communication line, a register in a central processing unit (CPU, for short), or the like.

The relay device 100 according to the present exemplary embodiment has a function of relaying communication between a terminal apparatus 200 and an information management apparatus 300, and includes a communication A module 105, a communication B module 110, a storage module 115, and a control module 120, as illustrated in the example of FIG. 1. The relay device 100 is protected from unauthorized access entering through the Internet by a firewall 350.

The communication A module 105 is connected to the storage module 115 and the control module 120, and is connected to the information management apparatus 300 via Internet communication 355 and the firewall 350. The communication A module 105 communicates with the information management apparatus 300 connected to the Internet via the firewall 350. Since the firewall 350 is provided, communication can be performed from the internal relay device 100 to the external information management apparatus 300, but communication from the information management apparatus 300 to the relay device 100 cannot be performed directly. However, in a case where the information is transmitted from the relay device 100 to the information management apparatus 300, and then information on the response to the transmission of the information is returned from the information management apparatus 300 to the relay device 100, the firewall 350 allows the information to pass, and thus the relay device 100 can receive information from the information management apparatus 300. Examples of "information from the information management apparatus 300" include designation of the mode of the terminal apparatus 200 (specifically, the first mode or the second mode). The first mode and the second mode will be described later.

The communication B module 110 is connected to the control module 120, and is connected to the terminal apparatus 200 via the near field communication 155. The communication B module 110 performs near field communication 155 with the terminal apparatus 200. Examples of near field communication 155 include Bluetooth (registered trademark), Wi-Fi, and the like. Specifically, there are Bluetooth Low Energy (BLE, for short), Wi-Fi-Direct, and the like. The near field communication 155 may include proximity wireless communication. Note that, the near field communication 155 is used for transmitting data having a larger data amount than the long-range wireless communication 255. However, the power consumption in the long-range wireless communication 255 is less than the power consumption in the near field communication 155. Therefore, in a case where the terminal apparatus 200 transmits data to the information management apparatus 300, the long-range wireless communication 255 is used for transmission of a small amount of data, and in a case where the terminal apparatus 200 transmits a large amount of data, transmission through the relay device 100 is used. Note that, "transmission through the relay device 100" means that the communication between the terminal apparatus 200 and the relay device 100 is near field communication 155, and the communication between the relay device 100 and the information management apparatus 300 is Internet communication 355.

The storage module 115 is connected to the communication A module 105 and the control module 120. The storage module 115 stores information for identifying the terminal apparatus 200 and mode instruction information that is instruction information indicating that the operation is to be performed in the second mode for acquiring data having a larger data amount than in the first mode. For example, it may be a table that stores the identification information of the terminal apparatus 200 and the mode instruction information in association with each other.

The information stored in the storage module 115 is information acquired from the information management apparatus 300 using the communication A module 105.

The control module 120 is connected to the communication A module 105, the communication B module 110, and the storage module 115. In a case where the terminal apparatus 200 connected using the communication B module 110 is a terminal apparatus that needs to operate in the second mode, the control module 120 performs control so as to transmit to the terminal apparatus 200, mode instruction information for instructing the operation in the second mode.

Then, the control module 120 performs control so as to transmit the data acquired from the terminal apparatus 200 using the communication B module 110 to the information management apparatus 300 using the communication A module 105. This control relays communication from the terminal apparatus 200 to the information management apparatus 300.

Here, the "first mode" is a mode for acquiring data having a data amount smaller than that in the second mode, and is a so-called normal mode. Hereinafter, the first mode is also referred to as a normal mode. The "second mode" is a mode for acquiring data having a larger data amount than in the first mode, and is a so-called detailed mode. Hereinafter, the second mode is also referred to as a detailed mode. In the second mode, the amount of data in one communication may be increased as compared to the first mode, or the number of communication in a unit time may be increased (or the communication interval may be shortened).

The "mode instruction information" may be instruction information indicating that the operation is to be performed in the first mode, or instruction information indicating that the operation is to be performed in the second mode. In either case, the state before this instruction is made is not defined. In other words, in the case of the instruction information indicating that the operation is to be performed in the first mode, the switching from the second mode to the first mode may be performed. For example, in a case where the mode is indefinite as in the terminal apparatus 200 immediately after power-on (so-called "blank state"), it may be set to operate in the first mode. Similarly, in the case of the instruction information indicating that the operation is to be performed in the second mode, the switching from the first mode to the second mode may be performed. For example, in a case where the mode is indefinite as in the terminal apparatus 200 immediately after power-on, it may be set to operate in the second mode.

Further, the communication B module 110 outputs advertisement information including information for identifying the terminal apparatus 200 stored in the storage module 115, and in a case where a connection request is received from the terminal apparatus 200 corresponding to the identification information, the communication B module 110 may establish the connection with the terminal apparatus 200. The "information for identifying the terminal apparatus 200 stored in the storage module 115" is identification information of the terminal apparatus 200 to be in the second mode.

Further, "output of advertisement information" is transmitting the same information to a plurality of terminal apparatuses 200 (generally at the same time), and examples of the technique include beacon and broadcast communication as communication methods. The information to be advertised is realized by an advertising packet or the like, and includes information for identifying the terminal apparatus 200 and information for communication connection.

This process will be described later using the example of FIGS. 18A and 18B.

Further, the communication B module 110 receives the advertisement information output by the terminal apparatus 200, and in a case where the received advertisement information includes information for identifying the terminal apparatus 200 stored in the storage module 115, the communication B module 110 may establish the connection with the terminal apparatus 200.

This process will be described later using the example of FIGS. 5A and 5B.

The advertisement information described above may include connection information for communication connection, and the communication B module 110 may establish a connection with the terminal apparatus 200 using the connection information. Specifically, the connection information includes at least one of address information or passcode information. In a case where the address information or the passcode information indicating the side (terminal apparatus 200 or relay device 100) that has transmitted the advertisement information is included, the communication B module 110 can communicate with the terminal apparatus 200, according to the communication protocol of the near field communication 155. Of course, the terminal apparatus 200 can also communicate with the relay device 100 according to the communication protocol of the near field communication 155.

In a case where the information acquired from the information management apparatus 300 does not include the identification information of the terminal apparatus 200 from which detailed data stored in the storage module 115 is to be acquired, the control module 120 may perform control to transmit to the target terminal apparatus 200, the mode instruction information which is instruction information indicating that the operation is to be performed in the first mode, and release the connection with the terminal apparatus 200 using the communication B module 110. That is, the communication B module 110 transmits the mode instruction information for switching to the first mode, to the terminal apparatus 200 that is to be switched from the second mode to the first mode. Of course, the terminal apparatus 200 receives the mode instruction information and sets itself to the first mode. Then, the communication B module 110 releases the connection with the terminal apparatus 200 because the relay device 100 does not need to relay communication between the terminal apparatus 200 and the information management apparatus 300.

When the list of the terminal apparatuses 200 that are to be in the second mode is acquired from the information management apparatus 300, in a case where there is no instruction for the terminal apparatus 200, which has been previously in the second mode, to be in the second mode, the mode is switched to the first mode.

Further, in a case where the information acquired from the terminal apparatus 200 includes the information indicating that transmission in the second mode is not required, the control module 120 may release the connection with the terminal apparatus 200 using the communication B module 110. That is, in a case where the information about changing from the second mode to the first mode is received from the terminal apparatus 200 which is in the second mode, the communication B module 110 releases the connection with the terminal apparatus 200 because the relay device 100 does not need to relay communication between the terminal apparatus 200 and the information management apparatus 300.

Here, the "information indicating that transmission in the second mode is not required" may be mode instruction information that is instruction information indicating that the operation is to be performed in the first mode.

Further, the mode instruction information that is instruction information indicating that the operation is to be performed in the first mode may be transmitted to the terminal apparatus 200. Of course, before the connection with the terminal apparatus 200 is released, the mode instruction information that is instruction information indicating that the operation is to be performed in the first mode is transmitted to the terminal apparatus 200. This is because the terminal apparatus 200 can cope with the case where the mode is set only in a case where the mode instruction information is received from the relay device 100. That is, even in a case where the mode instruction information that is instruction information indicating that the operation is to be performed in the first mode is received from the information management apparatus 300, in a case where the mode instruction information that is instruction information indicating that the operation is to be performed in the first mode is not received from the relay device 100, the terminal apparatus 200 can cope with the case where the setting is such that the first mode is not set.

Further, "information indicating that transmission in the second mode is not required" is information transmitted by communication from the information management apparatus 300 to the terminal apparatus 200, which is neither communication by the communication A module 105 nor near field communication 155 by the communication B module 110, from the information management apparatus 300 to the terminal apparatus 200.

Here, "communication from the information management apparatus 300 to the terminal apparatus 200, which is neither communication by the communication A module 105 nor near field communication 155 by the communication B module 110" refers to communication directly from the information management apparatus 300 to the terminal apparatus 200 without going through the relay device 100.

In a case where the advertisement information output from the terminal apparatus 200 is received and the advertisement information does not include information for identifying the terminal apparatus 200 stored in the storage module 115, control may be performed so as to establish the connection by using the communication B module 110, transmit to the terminal apparatus 200, the mode instruction information which is instruction information indicating that the operation is to be performed in the first mode, and thereafter release the connection with the terminal apparatus 200 using the communication B module 110.

Only the connection with the terminal apparatus 200 in the second mode is maintained, and the connection with the terminal apparatus 200 in the first mode is not performed, so that the load of the network connection of the relay device 100 is reduced. This process will be described later using the example of FIGS. 5A and 5B.

The control module 120 may communicate with the information management apparatus 300 at periodic times using the communication A module 105, acquire information for identifying the terminal apparatus 200 and mode instruction information from the information management apparatus 300, and store the acquired information in the storage module 115.

Here, the period in "periodic times" may be every 12 hours, every day, every week, every month, or the like. This "every day" includes, for example, every morning (specifically, a time before a predetermined working time).

Then, the control module 120 may control to perform periodic communication, before the near field communication 155 with the terminal apparatus 200 becomes possible.

Here, "before the near field communication 155 with the terminal apparatus 200 becomes possible" refers to the state where the terminal apparatus 200 cannot perform the near field communication 155 with the relay device 100. For example, it corresponds to a situation where a person wearing the wearable computer is not in the vicinity, such as before working time, in a case where the terminal apparatus 200 is a wearable computer. More specifically, the information management apparatus 300 analyzes the health information acquired from each person's wearable computer after the leaving time, and extracts a person from whom more detailed data needs to be acquired. Before working time, the relay device 100 periodically accesses the information management apparatus 300. In that case, the relay device 100 may receive the identification information of the wearable computer of the person and the mode instruction information, from the information management apparatus 300.

The terminal apparatus 200 is connected to the communication B module 110 of the relay device 100 via the near field communication 155, and is connected to the information management apparatus 300 via the long-range wireless communication 255. The terminal apparatus 200 will be described later using the example of FIG. 2.

The information management apparatus 300 is connected to the communication A module 105 of the relay device 100 via the firewall 350 and the Internet communication 355, and is connected to the terminal apparatus 200 via the long-range wireless communication 255. The information management apparatus 300 will be described later using the example of FIG. 3.

Figure 2:
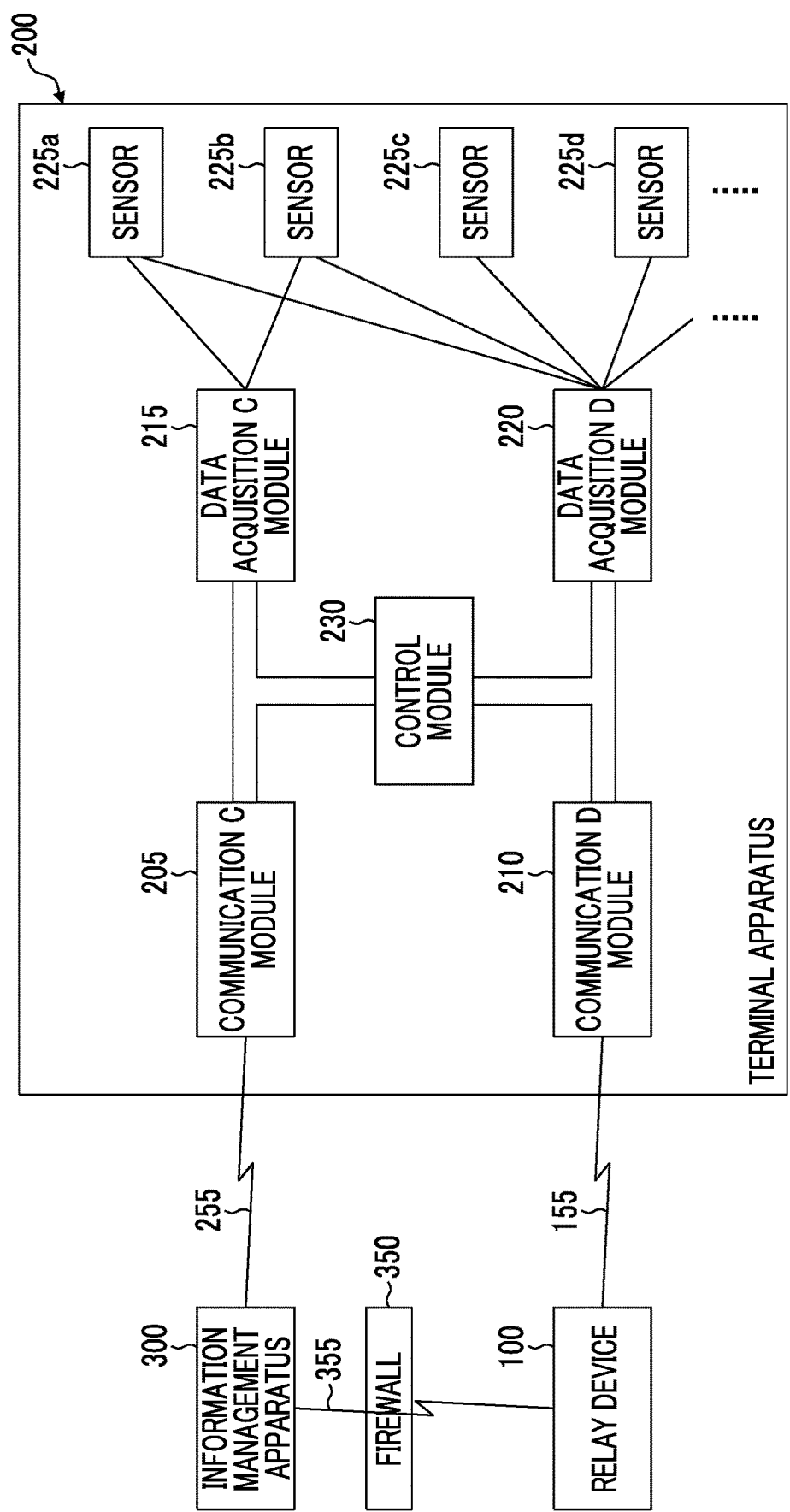
FIG. 2 is a conceptual module configuration diagram for a configuration example of a terminal apparatus which is the present exemplary embodiment.

FIG. 2 shows a conceptual module configuration diagram for a configuration example of the terminal apparatus 200 which is the present exemplary embodiment.

The terminal apparatus 200 includes a communication C module 205, a communication D module 210, a data acquisition C module 215, a data acquisition D module 220, a sensor 225a, a sensor 225b, a sensor 225c, a sensor 225d, and a control module 230.

The terminal apparatus 200 has at least two communication means (communication method C via a base station (long-range wireless communication 255) and communication method D via the relay device 100 (near field communication 155)), acquires data, and transmits the data to the information management apparatus 300 by any communication means. For example, it includes what is called an Internet of Things (IoT) terminal. Specifically, examples are a portable information communication device (as a portable information communication device, including mobile phones, smartphones, mobile devices, wearable computers, or the like) that can detect information on the human body (also referred to as biological information, more specifically, body temperature, heart rate information, electrocardiogram information, body temperature information, or the like), communication devices with sensors (thermo-hygrometers, strain gauges, or the like) that detect a state of building (temperature, humidity, strain of buildings such as bridges), and communication devices with sensors (thermo-hygrometers, weather sensors, or the like) that detect weather information (temperature, humidity, pressure, brightness, ultraviolet rays, noise, or the like).

The communication C module 205 is connected to the data acquisition C module 215 and the control module 230, and is connected to the information management apparatus 300 via the long-range wireless communication 255. There are at least two or more data areas in the data handled in the mobile phone communication between the terminal apparatus 200 and the base station of the mobile phone communication network, the first data area out of the data areas is for a data amount smaller than the data amount of the second data area which is the another data area, the data acquired by the terminal apparatus 200 is included in the first data area, and the communication C module 205 transmits and receives data with the information management apparatus 300 outside a firewall via the base station, by using a communication method in which data is transmitted and received only in the first data area.

The communication D module 210 is connected to the data acquisition D module 220 and the control module 230, and is connected to the relay device 100 via the near field communication 155. The communication D module 210 performs near field communication with the relay device 100 in the firewall. Then, communication is performed with the information management apparatus 300 via the relay device 100.

In a case where communication is started by the communication D module 210, information (for example, address information or passcode information of the terminal apparatus 200) including identification information of the terminal apparatus 200 may be transmitted, and communication with the relay device 100 that has received the information may be established.

The data acquisition C module 215 is connected to the communication C module 205, the control module 230, the sensor 225a, and the sensor 225b. The data acquisition C module 215 acquires data from the sensor 225. Then, the data acquisition C module 215 transmits the acquired data to the information management apparatus 300 via the communication C module 205.

The data acquisition D module 220 is connected to the communication D module 210, the control module 230, the sensor 225a, the sensor 225b, the sensor 225c, and the sensor 225d. The data acquisition D module 220 acquires more data than the data acquired by the data acquisition C module 215 from the sensors 225. Then, the data acquisition D module 220 transmits the acquired data to the information management apparatus 300 via the communication D module 210 and the relay device 100. As described above, according to the instruction in the instruction information transmitted from the information management apparatus 300 or the relay device 100, for example, the data acquisition D module 220 may acquire data from more sensors 225 than the sensors 225 from which the data acquisition C module 215 acquires data, and may acquire data from the sensors 225 at an interval shorter than the interval at which the data acquisition C module 215 acquires data. Alternatively, the data acquisition D module 220 may transmit data to the information management apparatus 300 via the communication D module 210 and the relay device 100 at an interval shorter than the interval at which the data acquisition C module 215 transmits data to the information management apparatus 300 via the communication C module 205.

The sensor 225 is connected to the data acquisition C module 215 and the data acquisition D module 220. The sensor 225 detects the state of the target (the concept of measurement may be included in the detection), and passes the detection result to the data acquisition C module 215 or the data acquisition D module 220. As described above, information on the human body may be detected, the state of the building may be detected, or weather information may be detected. One or more sensors 225 may be provided. Examples of the sensor 225 that detects information on the human body include a heart rate sensor, a body temperature sensor, an electroencephalogram sensor, and a pulse oximeter.

The control module 230 is connected to the communication C module 205, the communication D module 210, the data acquisition C module 215, and the data acquisition D module 220. The control module 230 performs controls such that the data acquired by the data acquisition C module 215 is transmitted to the information management apparatus 300 using the communication C module 205 in a case of the first mode, and the data acquired by the data acquisition D module 220 is transmitted to the information management apparatus 300 using the communication D module 210 in a case of the second mode. Specifically, the control module 230 performs control such that the data acquired by the data acquisition C module 215 from the sensor 225 is transmitted to the information management apparatus 300 using the communication C module 205, and in a case where the communication C module 205 receives the instruction information instructing to perform the communication via the relay device from the communication via the base station, the data acquired by the data acquisition D module 220 is transmitted to the information management apparatus 300 using the communication D module 210. Of course, the route from the communication D module 210 to the information management apparatus 300 is the near field communication 155, the relay device 100, the firewall 350, and the Internet communication 355.

Further, in a case where the communication D module 210 receives the mode instruction information from the relay device 100, the control module 230 may perform control so as to transmit the data acquired by the data acquisition D module 220 to the information management apparatus 300 using the communication D module 210. The "mode instruction information" here is mode instruction information for instructing an operation in the second mode.

Further, in a case where the communication C module 205 receives the information indicating that transmission in the second mode is not required from the information management apparatus 300, the control module 230 may perform control to transmit the data acquired by the data acquisition C module 215 to the information management apparatus 300, using the communication C module 205.

Further, in a case where the communication C module 205 receives the information indicating that transmission in the second mode is not required from the information management apparatus 300, the control module 230 may release the connection with the relay device 100 using the communication D module 210.

The relay device 100 has been described above using the example of FIG. 1. The information management apparatus 300 will be described later using the example of FIG. 3.

Figure 3:
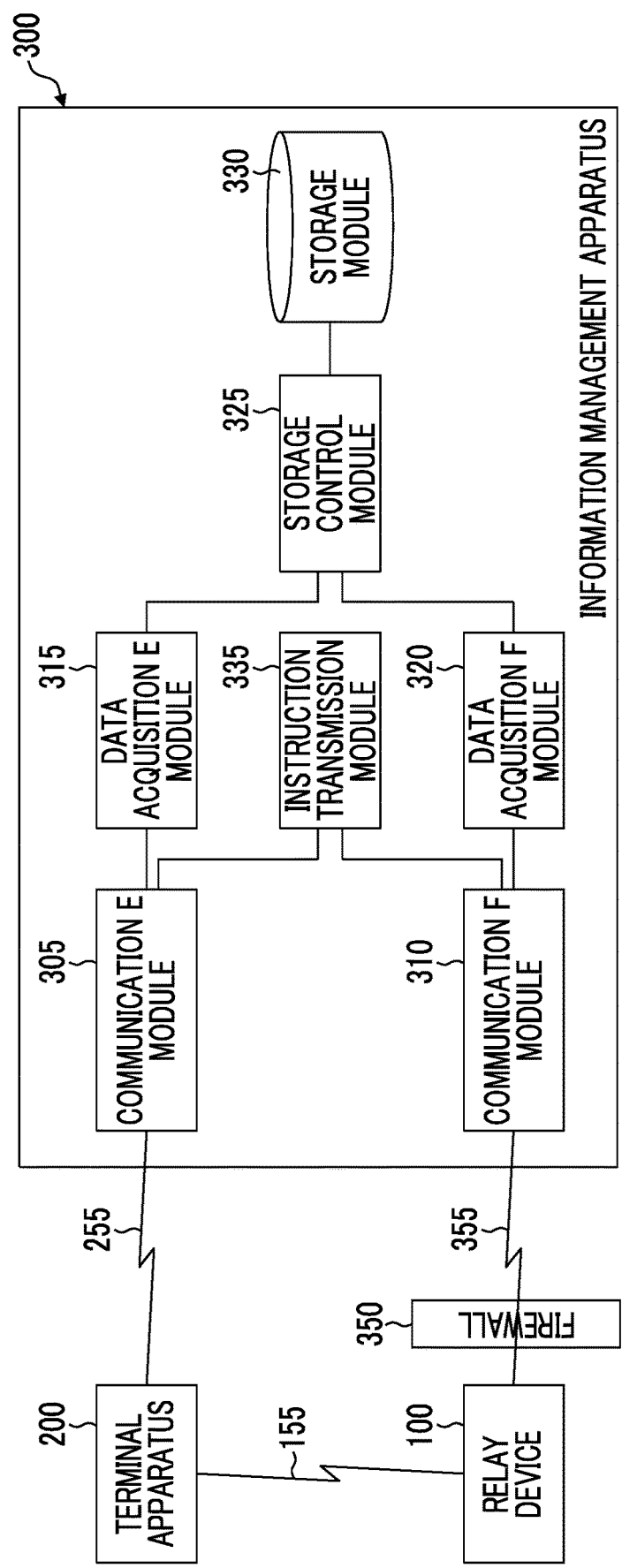
FIG. 3 is a conceptual module configuration diagram for a configuration example of an information management apparatus which is the present exemplary embodiment.

The information management apparatus 300 has a function of acquiring data transmitted from the terminal apparatus 200 and managing the data. As shown in the example of FIG. 3, the information management apparatus 300 includes the communication E module 305, the communication F module 310, the data acquisition E module 315, the data acquisition F module 320, the storage control module 325, the storage module 330, and the instruction transmission module 335.

In particular, the information management apparatus 300 determines the terminal apparatus 200 to be in the second mode for requiring a larger data amount than in the first mode. Conversely, the terminal apparatus 200 that returns from the second mode to the first mode may be determined.

Between the information management apparatus 300 and the terminal apparatus 200, communication can be performed by either (1) a communication method C via a base station of a mobile phone communication network (long-range wireless communication 255), or (2) a communication method capable of performing communication via the relay device 100 and the Internet (Internet communication 355). In such a communication environment, the information management apparatus 300 may want to instruct the terminal apparatus 200 to perform any communication. That is, the data is acquired from the terminal apparatus 200 via a communication path convenient for the information management apparatus 300 to handle the data acquired by the terminal apparatus 200.

The information management apparatus 300 according to the present exemplary embodiment instructs the terminal apparatus 200 to change from the long-range wireless communication 255 to the near field communication 155 (Internet communication 355 from the relay device 100 to the information management apparatus 300). The information management apparatus 300 according to the present exemplary embodiment instructs the terminal apparatus 200 to change from the near field communication 155 to the long-range wireless communication 255.

The communication E module 305 is connected to the data acquisition E module 315 and the instruction transmission module 335. Out of a first data area that is a fixed-length data area used in the communication procedure in the mobile phone communication between the terminal apparatus 200 and the base station of the mobile phone communication network and a second data area that is used in data communication after establishing communication in the communication procedure and is a variable-length area corresponding to data transmitted, data acquired by the terminal apparatus 200 is included in the first data area, the communication E module 305 transmits and receives data via the base station by using a communication method in which data is transmitted and received only in the first data area.

The long-range wireless communication 255 is "a communication method in which out of a first data area that is a fixed-length data data area used in the communication procedure in the mobile phone communication between the terminal apparatus 200 and the base station of the mobile phone communication network and a second data area that is used in data communication after establishing communication in the communication procedure and is a variable-length area corresponding to data transmitted, data acquired by the terminal apparatus 200 is included in the first data area, and data is transmitted and received only in the first data area".

The "first data area" herein is used in the communication procedure of mobile phone communication, and is a fixed-length area that includes control information. For example, a control plane (C-plane) corresponds to mobile phone communication. The "second data area" is a data area other than the fixed-length area of the control information used in the communication procedure described above, a variable-length data area for storing data to be transmitted, after communication is established by the communication procedure, and an area that contains data used by users. This data area is an area prepared for data to be transmitted, and is an area that has an upper limit but is prepared for a larger amount of data than the first data area. For example, in mobile phone communication, a user plane (U-plane) containing voice data and packet data corresponds thereto.

In the "communication method performed by the communication E module 305", data is transmitted and received only in the first data area, and the second data area is not used for transmission and reception.

This communication method is a fixed-length data communication with a small amount of data used only in the communication procedure. Since this communication method has a small communication bandwidth and a few data transmission and reception procedures, communication can be performed with low power consumption, this communication method can be provided at a lower cost than the communication method of mobile phone communication using the second data area where variable and large communication bandwidth needs to be prepared.

As this communication method, low power and wide area (LPWA, for short) may be used. As a specific example, non-IP data delivery (NIDD, for short) communication is applicable.

In recent years, as wide-area communication means for an information management apparatus to acquire data from IoT equipment, the LPWA communication standard enabling communication at lower power consumption and lower bit rate than current mobile phone communication has been proposed.

As the LPWA, SIGFOX, LoRa, Wi-Fi HaLow, Wi-SUN, and the like are known, and all are wireless access that covers a range that cannot be met with near field communication (up to about several tens of meters) such as Bluetooth. In particular, these are communication methods with low power consumption, low bit rate, and wide area coverage. These communication methods are applicable instead of NIDD.

There are at least two or more areas in the data handled in the mobile phone communication between the terminal apparatus 200 and the base station of the mobile phone communication network, the first data area out of the data areas is for a data amount smaller than the data amount of the second data area, which is the another data area, the data acquired by the terminal apparatus 200 is included in the first data area, and the communication E module 305 may transmit and receive data via the base station, by using a communication method in which data is transmitted and received only in the first data area. Further, data transmission and reception may be performed via a base station using a communication method of the LPWA communication standard enabling communication at lower power consumption and lower bit rate than the above-described current mobile phone communication.

The communication F module 310 is connected to the data acquisition F module 320 and the instruction transmission module 335. The communication F module 310 communicates with the terminal apparatus 200 via the relay device 100 connected to a communication line protected by the firewall 350 and the Internet communication 355.

The data acquisition E module 315 is connected to the communication E module 305 and the storage control module 325. The data acquisition E module 315 acquires, from the terminal apparatus 200, data including the first data acquired by the terminal apparatus 200 and the identification information of the terminal apparatus 200, using the communication E module 305.

The data acquisition F module 320 is connected to the communication F module 310 and the storage control module 325. The data acquisition F module 320 acquires data including the second data acquired by the terminal apparatus 200 and the identification information of the terminal apparatus 200 from the terminal apparatus 200, via the relay device 100 connected to the communication line protected by the firewall 350, using the communication F module 310.

The storage control module 325 is connected to the data acquisition E module 315, the data acquisition F module 320, and the storage module 330. The storage control module 325 controls the storage module 330 to store the data acquired by the data acquisition E module 315 or the data acquisition F module 320. In detail, "data acquired by the data acquisition E module 315 or the data acquisition F module 320" is data including the first data acquired by the data acquisition E module 315 and the identification information of the terminal apparatus 200, or data including the second data acquired by the data acquisition F module 320 and the identification information of the terminal apparatus 200.

The storage module 330 is connected to the storage control module 325. The storage module 330 stores the identification information of the terminal apparatus 200 and the data acquired from the terminal apparatus 200 in association with each other.

The instruction transmission module 335 is connected to the communication E module 305 and the communication F module 310. The instruction transmission module 335 transmits instruction information for instructing to perform communication via the relay device 100 from communication via the base station, to the terminal apparatus 200, using the communication E module 305. That is, the instruction transmission module 335 instructs the terminal apparatus 200 to change from the long-range wireless communication 255 to the near field communication 155. In addition, the example in which the communication E module 305 is used for the communication in that case is shown, but the communication F module 310 may be used. For example, the communication E module 305 may be used in a case where the terminal apparatus 200 is in the first mode as the target, and the communication F module 310 may be used in a case where the terminal apparatus 200 is in the second mode. Further, regardless of whether the terminal apparatus 200 as the target is in the first mode or the second mode, either the communication E module 305 or the communication F module 310 may be used.

The second data may have a larger data amount than the first data. The instruction transmission module 335 may transmit instruction information for changing from the first mode to the second mode, in a case where it is necessary to acquire more detailed data than the first data.

The instruction information may include information indicating the type of information to be acquired by the terminal apparatus 200.

Further, in addition to the type of information included in the first data, the instruction information may include information indicating a type different from the type. That is, different types of data are transmitted. For example, this corresponds to a case where in the first mode, the heart rate is acquired as the first data, and in the second mode, electrocardiogram information and body temperature information are further added.

The instruction information may include information indicating an interval at which the terminal apparatus 200 acquires data. In a case of changing from the first mode to the second mode, the acquisition interval is shortened. For example, this corresponds to a case where data which has been measured once a day is measured hourly.

The instruction information may include information indicating an interval of data transmission by the terminal apparatus 200. In a case of changing from the first mode to the second mode, the communication interval is shortened. For example, this corresponds to a case where data which has been transmitted once a day is transmitted hourly.

Further, the instruction information may include information related to the relay device 100 with which the terminal apparatus 200 is to communicate. Here, "information on the relay device 100" is information for the terminal apparatus 200 to connect to the relay device 100, and includes, for example, the address of the relay device 100.

Even in a case where there are a plurality of relay devices 100 in the vicinity of the terminal apparatus 200, and connection requests are received from the plurality of relay devices 100 for the terminal apparatus 200 to connect to the relay device 100, an appropriate relay device 100 can be selected.

In this case, in a case where there are a plurality of relay devices 100 in the vicinity of the terminal apparatus 200, the instruction transmission module 335 may include in the instruction information, information on the relay device 100 with a small number of terminal apparatuses 200 that are already communicating.

In addition, the instruction information may include the address of the information management apparatus 300 in a case of performing communication via the Internet.

Since the terminal apparatus 200 knows the address of the information management apparatus 300 in the mobile phone communication network, but does not know the address (for example, uniform resource locator (URL, for short)) of the information management apparatus 300 in the Internet of the communication F module 310, it is necessary to inform the address.

However, in a case where the relay device 100 knows the address of the information management apparatus 300 in advance, the relay device 100 may transmit the address to the terminal apparatus 200. In that case, it is not necessary to include the address of the information management apparatus 300 in the instruction information.

The instruction transmission module 335 may transmit the instruction information, in a case where the first data acquired by the data acquisition E module 315 changes under a predetermined condition.

The "predetermined condition" may be a case where the amount of data transmitted by the terminal apparatus 200 increases compared to the previous communication.

Here, the "amount of data transmitted" is the amount of data transmitted within a predetermined period. The amount of data transmitted may be the amount of data received by the information management apparatus 300, or the amount of data transmitted by the terminal apparatus 200 to the information management apparatus 300. In the former case, for example, the information management apparatus 300 may detect that data to be transmitted by the terminal apparatus 200 is increasing. In the latter case, the terminal apparatus 200 may transmit the amount of data transmitted to the information management apparatus 300. Note that, the cause of the increase of the amount of data transmitted may include a case where the communication state of the mobile phone communication network is poor and data to be transmitted at a time increases.

Further, the "predetermined condition" may be a case where the first data acquired by the data acquisition E module 315 is set to exceed a predetermined threshold.

For example, a case where a predetermined threshold is exceeded due to a sharp rise in the heart rate, or the like is applicable.

Further, the "predetermined condition" may be a case where the first data acquired by the data acquisition E module 315 changes in a predetermined pattern.

For example, abnormalities in data contents are detected in a case where the heart rate changes up and down in a short period of time.

Further, in a case where the second data acquired by the data acquisition F module 320 no longer meets the above-described predetermined condition, the instruction transmission module 335 may transmit change information that changes to perform communication via the base station from communication via the relay device 100. That is, the mode is changed from the second mode to the first mode.

In addition, in the case of "in a case where the above-described predetermined condition is no longer met", it may be added that a predetermined period has elapsed since the condition is no longer met.

Further, the "predetermined condition" may be a case where the acquisition interval of the first data by the data acquisition E module 315 is longer than the previous acquisition interval.

Since it is assumed that the communication state of the mobile phone communication network deteriorates, in a case where the communication state deteriorates, it is instructed to use the relay device 100 and the Internet communication 355 without using the communication path of the long-range wireless communication 255 which is the mobile phone communication network. Specifically, the communication interval in the first mode is stored as a log, and in a case where the communication interval becomes longer than the communication interval in the past (which may be limited to the immediately before as the past), the communication mode is changed from the first mode to the second mode. However, in this case, the data acquired by the data acquisition F module 320 remains the first data (so-called normal data).

Further, the storage module 330 may store the identification information of the terminal apparatus 200 and the information of the user of the terminal apparatus 200 in association with each other.

Then, in a case where the second data cannot be acquired by the data acquisition F module 320, the instruction transmission module 335 may notify the user corresponding to the identification information of the terminal apparatus 200.

Specifically, in a case where the instruction transmission module 335 receives information from the terminal apparatus 200 that communication via the relay device 100 is impossible, the instruction transmission module 335 may notify the user corresponding to the identification information of the terminal apparatus 200.

In addition, in a case where the communication by the communication F module 310 is impossible, the instruction transmission module 335 may notify the user corresponding to the identification information of the terminal apparatus 200.

FIG. 4 is a diagram illustrating a system configuration example using the present exemplary embodiment.

FIG. 4 shows an example in which the terminal apparatus 200 shown in FIG. 2 is a wearable computer which is worn by each user 400 and detects information on the human body of the user 400. An example assuming a so-called health management service is shown. The terminal apparatus 200 is also called an IoT device.

The base 450 corresponds to a room in a company or the like, for example. For example, there is a user 400 who is an employee. The user 400 is generally a plurality of users, but may be a single user.

The relay device 100 is installed in the base 450. The relay device 100 has a so-called edge server function. For example, a printer, a multifunction peripheral (an image processing apparatus having any two or more functions of a scanner, a printer, a copier, a fax machine, or the like) or the like may incorporate the relay device 100. The relay device 100 relays communication between the terminal apparatus 200 and the information management apparatus 300 via the firewall 350 and the Internet 360. Near field communication 155 is used for communication between the terminal apparatus 200 and the relay device 100, and Internet communication 355 is used for communication between the relay device 100 and the information management apparatus 300. The relay device 100 is in the firewall 350. That is, communication from the relay device 100 to the information management apparatus 300 is possible, but communication from the information management apparatus 300 to the relay device 100 is restricted.

Further, it is assumed that the user 400 is within a range where the relay device 100 can perform the near field communication 155. That is, it is assumed that the relay device 100 and the terminal apparatus 200 can communicate with each other. The near field communication 155 is an example of communication performed by the communication B module 110 described above, and the Internet communication 355 is an example of communication performed by the communication A module 105 described above.

The information management apparatus 300 has a function as a management server for information on the human body. Of course, the functions of the information management apparatus 300 may be realized as a cloud service. For example, poor physical condition, fatigue, and the like of the user 400 are detected using the heart rate information of the user 400, and a message that alerts the user 400 or another person (for example, a boss) may be notified using e-mail or the like.

The base station 410 is also referred to as a mobile base station, and may be a base station 410 of a telecommunication carrier (so-called carrier system), or a base station 410 other than a telecommunication carrier (so-called independent line). The terminal apparatus 200 communicates with the base station 410 by the long-range wireless communication 255. The long-range wireless communication 255 is a public line and is used for periodic notification and transmission of a small amount of data. The long-range wireless communication 255 is an example of communication performed by the communication C module 205 and the communication E module 305 described above. The base station 410 and the information management apparatus 300 may perform communication using the Internet communication 355 or may perform communication using a telephone line. Examples of the long-range wireless communication 255 include, specifically, NIDD communication. Only the "control plane" that controls the communication of the mobile phone protocol is used. That is, the "user plane" of voice data and packet data is not used. In the NIDD communication, IP is not required, the SIM of the terminal apparatus 200 is identified by the IMSI information, the communication data amount is small, the power consumption is low, and only the control plane is used, so it is possible to provide a service at a very low price (may include free service).

At normal times, the terminal apparatus 200 communicates with the base station 410 by the long-range wireless communication 255 to transmit information on the human body of the user 400 to the information management apparatus 300. Note that, the normal time refers to a state in which the information management apparatus 300 has not detected health abnormalities of the user 400. That is, it is a state where it is determined that it is not necessary to acquire detailed data from the terminal apparatus 200, which is the first mode (normal mode) described above.

The information management apparatus 300 analyzes the data from the terminal apparatus 200 transmitted via the base station 410, and instructs the terminal apparatus 200 to transmit detailed data, in a case of detecting health abnormalities of the user 400. This is the second mode (detailed mode) described above. This instruction may be performed by communication of the long-range wireless communication 255 via the base station 410. Examples of "health abnormalities" include that the physical condition has suddenly changed, high overtime continues, and there is an abnormal value in the health check result. Note that "the physical condition has suddenly changed" may be determined by the data acquired by the information management apparatus 300 in the normal mode. "High overtime continues" may be determined from the overtime data acquired by the information management apparatus 300 from the attendance management apparatus that manages the attendance of the user 400. "There is an abnormal value in the health check result" may be determined from data acquired by the information management apparatus 300 from the health management apparatus that manages the health check result of the user 400. The detailed data has a larger data amount than the data in the normal mode, and is not used for NIDD communication. Therefore, the information management apparatus 300 instructs the terminal apparatus 200 to perform communication via the relay device 100 and the Internet 360 (so as to set the second mode).

In accordance with this instruction, the terminal apparatus 200 is set to the second mode, detects detailed data, establishes communication by the near field communication 155 with the relay device 100, and transmits the detailed data to the information management apparatus 300 via the relay device 100. That is, the Internet communication 355 is used for a large amount of data or continuous transmission of data when the situation changes.

In a case where the information management apparatus 300 analyzes detailed data transmitted from the terminal apparatus 200 via the relay device 100 and the Internet 360, and detects health abnormalities of the user 400, as described above, the information management apparatus 300 notifies the user 400 or another person of a message, using an e-mail or the like.

Conversely, in a case where the information management apparatus 300 determines that the measurement data of the user 400 is normal, the information management apparatus 300 instructs the terminal apparatus 200 to change from the second mode to the first mode. This instruction may be performed by communication of the long-range wireless communication 255 via the base station 410. Further, in the long-range wireless communication 255, the terminal apparatus 200 and the information management apparatus 300 can communicate bidirectionally. The Internet communication 355 is basically one-way communication from the terminal apparatus 200 to the information management apparatus 300 because the Internet communication 355 passes via the firewall 350.

Figure 5B:
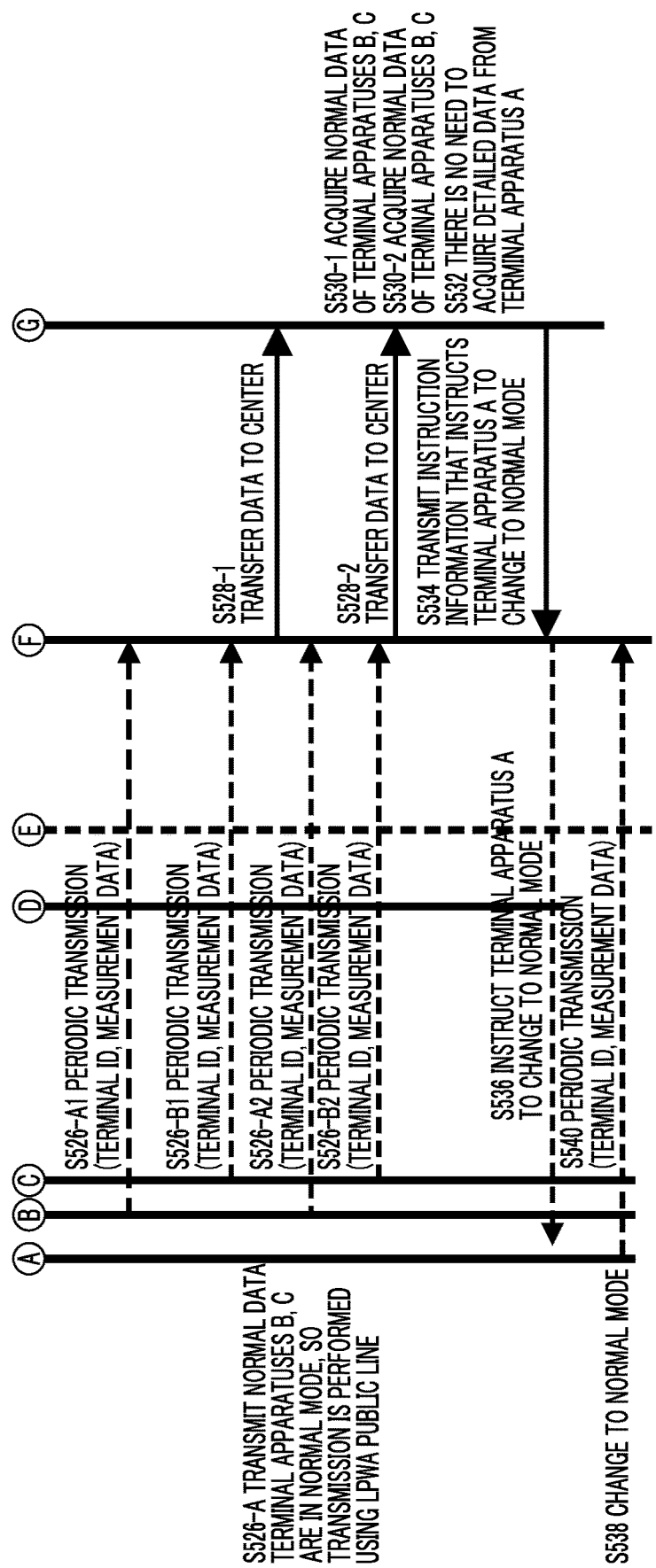

FIGS. 5A and 5B are flowcharts illustrating a process example (1) according to the present exemplary embodiment.

In step S502, the information management apparatus 300 specifies the terminal apparatus A: 200A as a monitoring target. That is, the terminal apparatus A: 200A to be set to the detailed mode is determined.

In step S504, the relay device 100 performs periodic access to the information management apparatus 300 once a day. For example, access is made every morning at a predetermined time.

In step S506, the relay device 100 acquires detailed mode change information for the terminal apparatus A: 200A.

In step S508-A, each terminal apparatus 200 transmits a beacon every morning.

In step S508-B, each terminal apparatus 200 transmits a BLE beacon (terminal ID and terminal address of each terminal apparatus 200) to the relay device 100.

In step S510, the relay device 100 detects that the detected beacon includes the terminal apparatus A: 200A from which detailed data is to be acquired (to be set to the second mode).

In step S512-A, the relay device 100 establishes a near field communication connection with the terminal apparatus A: 200A.

In step S512-B, near field communication connection is performed between the terminal apparatus A: 200A and the relay device 100.

In step S512-C, near field communication connection is performed between the terminal apparatus A: 200A and the relay device 100.

In step S514-A, the relay device 100 determines to transmit an instruction to change to the detailed mode to the terminal apparatus A: 200A.

In step S514-B, the relay device 100 transmits an instruction to change to the detailed mode to the terminal apparatus A: 200A.

In step S516, the terminal apparatus A: 200A receives the instruction to change to the detailed mode, and changes to the detailed mode.

In step S518, each terminal apparatus 200 acquires biological data (heart rate/body temperature/ . . . ). However, the terminal apparatus A: 200A in the detailed mode acquires detailed data, and the terminal apparatus B: 200B and the terminal apparatus C: 200C in the normal mode acquire normal data.

In step S520-A, the terminal apparatus A: 200A is controlled to transmit the detailed data to the relay device 100.

In step S520-B, the terminal apparatus A: 200A transmits the detailed data to the relay device 100.

In step S522, the relay device 100 transmits the detailed data to the information management apparatus 300 using the Internet.

In step S524, the information management apparatus 300 acquires detailed data from the terminal apparatus A: 200A via the relay device 100.

In step S526-A, the terminal apparatus B: 200B and the terminal apparatus C: 200C transmit normal data to the base station 410. Specifically, the following processing is performed.

In step S526-A1, the terminal apparatus B: 200B performs periodic transmission (terminal ID of the terminal apparatus B: 200B, measurement data) to the base station 410.

In step S526-B1, the terminal apparatus C: 200C performs periodic transmission (terminal ID of the terminal apparatus C: 200C, measurement data) to the base station 410.

In step S526-A2, the terminal apparatus B: 200B performs periodic transmission (terminal ID of the terminal apparatus B: 200B, measurement data) to the base station 410.

In step S526-B2, the terminal apparatus C: 200C performs periodic transmission (terminal ID of the terminal apparatus C: 200C, measurement data) to the base station 410.

In step S528-1, the base station 410 transfers data to the information management apparatus 300.

In step S528-2, the base station 410 transfers data to the information management apparatus 300.

In step S530-1, the information management apparatus 300 acquires normal data of the terminal apparatus B: 200B and the terminal apparatus C: 200C.

In step S530-2, the information management apparatus 300 acquires normal data of the terminal apparatus B: 200B and the terminal apparatus C: 200C.

In step S532, it is determined that there is no need to acquire detailed data from the terminal apparatus A: 200A.

In step S534, the information management apparatus 300 transmits to the base station 410, instruction information that instructs the terminal apparatus A: 200A to change to the normal mode.

In step S536, the base station 410 transmits an instruction that instructs the terminal apparatus A: 200A to change to the normal mode.

In step S538, the terminal apparatus A: 200A receives the instruction to change to the normal mode, and changes to the normal mode.

In step S540, the terminal apparatus A: 200A performs periodic transmission (terminal ID of the terminal apparatus A: 200A, measurement data) to the base station 410.

The terminal apparatus 200 transmits data measured by the long-range wireless communication 255 to the information management apparatus 300 using, for example, transmission data 600. This is data that the terminal apparatus 200 transmits to the information management apparatus 300 in steps S526, S528 in the flowchart shown in the example of FIGS. 5A and 5B, and corresponds to data that the information management apparatus 300 receives in step S530.

FIG. 6 is an explanatory diagram showing a data structure example of the transmission data 600. The transmission data 600 has a terminal apparatus ID field 605, an acquisition date and time field 610, and a measurement data A field 615. The terminal apparatus ID field 605 stores information (specifically, terminal apparatus identification (ID)) for uniquely identifying the terminal apparatus 200 in the present exemplary embodiment. The acquisition date and time field 610 stores the date and time (year, month, day, hour, minute, second, second or less, or a combination thereof) when the terminal apparatus 200 measures data. The measurement data A field 615 stores, for example, data A measured by the sensor 225a.

The information management apparatus 300 stores, for example, the user-terminal apparatus correspondence table 700 or the user-terminal apparatus correspondence table 750, and manages the correspondence between the user 400 and the terminal apparatus 200. Thereby, the data acquired from the terminal apparatus 200 may be recognized as data indicating the physical condition of who (user 400), and the physical condition of the user 400 can be managed.

FIG. 7A is an explanatory diagram showing a data structure example of the user-terminal apparatus correspondence table 700. The user-terminal apparatus correspondence table 700 has a user ID field 705 and a terminal apparatus ID field 710. The user ID field 705 stores information (specifically, a user ID) for uniquely identifying the user 400, in the present exemplary embodiment. The terminal apparatus ID field 710 stores the terminal apparatus ID of the terminal apparatus 200 worn by the user 400.

In a case where the user 400 is wearing a plurality of terminal apparatuses 200, the user-terminal apparatus correspondence table 750 may be used.

FIG. 7B is an explanatory diagram showing a data structure example of the user-terminal apparatus correspondence table 750. The user-terminal apparatus correspondence table 750 includes a user ID field 705, a terminal apparatus number field 755, a terminal apparatus ID field 760, and the like. The user ID field 705 stores a user ID. The terminal apparatus number field 755 stores the number of terminal apparatuses 200 worn by the user 400. By this number, the terminal apparatus ID field 760 follows the terminal apparatus number field 755. The terminal apparatus ID field 760 stores the terminal apparatus ID that the user 400 is wearing.

The information management apparatus 300 stores, for example, a user management table 800. The user management table 800 is a table for managing the terminal apparatus 200 and the notification destination. The contact destination in a case where the health abnormality of the user 400 is detected is managed.

Figure 8:
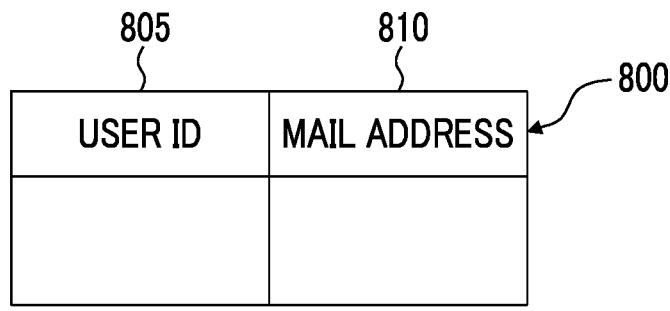
FIG. 8 is an explanatory diagram showing a data structure example of a user management table.

FIG. 8 is an explanatory diagram showing a data structure example of the user management table 800. The user management table 800 has a user ID field 805 and a mail address field 810. The user ID field 805 stores a user ID. The mail address field 810 stores the mail address of the user 400. Note that, the address is not limited to a mail address, and any address that can be notified to the user may be used. For example, chatting, an electronic bulletin board, and social networking service (SNS) have communication functions, push notifications, phone calls by automatic voice response, or the like. For example, Lync (registered trademark) or the like may be used as a phone call. Further, not only the address of the user 400 but also the address of a boss or a family may be registered as a contact destination at the time of abnormality.

Figure 9:
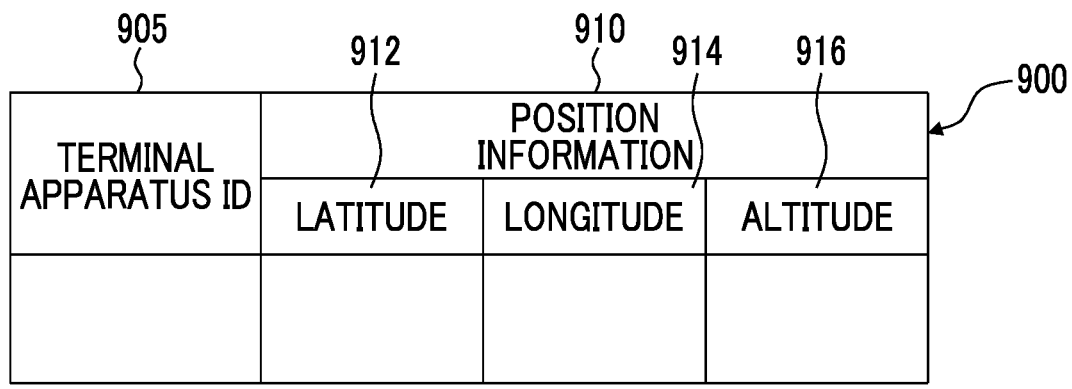
FIG. 9 is an explanatory diagram showing a data structure example of a terminal apparatus-position correspondence table.

The information management apparatus 300 stores, for example, a terminal apparatus-position correspondence table 900. FIG. 9 is an explanatory diagram showing a data structure example of the terminal apparatus-position correspondence table 900. The terminal apparatus-position correspondence table 900 includes a terminal apparatus ID field 905 and a position information field 910. The position information field 910 includes a latitude field 912, a longitude field 914, and an altitude field 916. The terminal apparatus ID field 905 stores the terminal apparatus ID. The position information field 910 stores position information of the terminal apparatus 200. The latitude field 912 stores latitude. The longitude field 914 stores longitude. The altitude field 916 stores the altitude. As the position information, for example, GPS information may be acquired from the terminal apparatus 200 (or a portable information terminal such as a smartphone that the user 400 has).

The information management apparatus 300 analyzes the health state of the user 400 using the user-measurement data correspondence table 1000.

Figure 10:
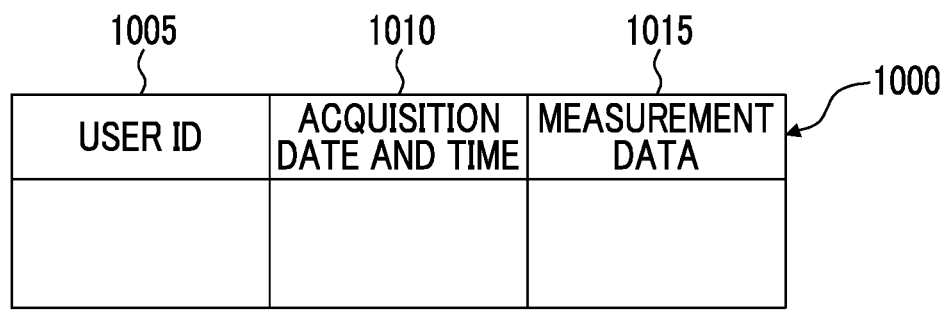
FIG. 10 is an explanatory diagram showing a data structure example of a user-measurement data correspondence table.

FIG. 10 is an explanatory diagram showing a data structure example of the user-measurement data correspondence table 1000. The user-measurement data correspondence table 1000 is generated by the transmission data 600 acquired from the terminal apparatus 200, the user-terminal apparatus correspondence table 700, or the user-terminal apparatus correspondence table 750. The user-measurement data correspondence table 1000 has a user ID field 1005, an acquisition date and time field 1010, and a measurement data field 1015. The user ID field 1005 stores a user ID. The acquisition date and time field 1010 stores the date and time when the measurement data of the user 400 is acquired. The measurement data field 1015 stores measurement data for the user 400.

The information management apparatus 300 transmits the instruction information table 1100 to the terminal apparatus 200, in a case of changing from the normal mode to the detailed mode (or in a case of changing from the detailed mode to the normal mode). The instruction information table 1100 is an example of instruction information. As described above, this transmission may be performed from the information management apparatus 300 to the terminal apparatus 200 via the long-range wireless communication 255, or in a case where the relay device 100 has accessed the information management apparatus 300, in response to this access, data may be transmitted to the relay device 100 via the Internet communication 355, and the relay device 100 may transmit data to the target terminal apparatus 200 via the near field communication 155. In the latter case, even in a case where there is the firewall 350, after the relay device 100 accesses the information management apparatus 300, the instruction information table 1100 can be transmitted from the information management apparatus 300 to the relay device 100 via the Internet communication 355. A specific example corresponds to the case of step S1806 to be described later using the example of FIGS. 18A and 18B. Further, the communication path may be varied according to the mode change. For example, in a case of changing from the normal mode to the detailed mode, the Internet communication 355 may be used, and in a case of changing from the detailed mode to the normal mode, the long-range wireless communication 255 may be used. Conversely, in a case of changing from the detailed mode to the normal mode, the long-range wireless communication 255 may be used, and in a case of changing from the detailed mode to the normal mode, the Internet communication 355 may be used.

Figure 11:
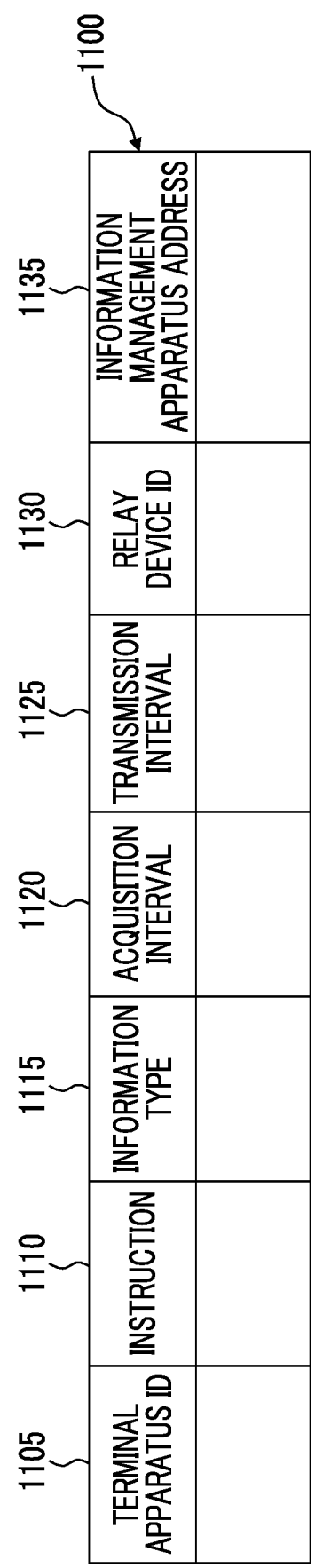
FIG. 11 is an explanatory diagram showing a data structure example of an instruction information table.

FIG. 11 is an explanatory diagram showing a data structure example of the instruction information table 1100. The instruction information table 1100 includes a terminal apparatus ID field 1105, an instruction field 1110, an information type field 1115, an acquisition interval field 1120, a transmission interval field 1125, a relay device ID field 1130, and an information management apparatus address field 1135. The terminal apparatus ID field 1105 sets the terminal apparatus ID of the terminal apparatus 200 that is the instruction destination. The instruction field 1110 sets an instruction. In the instruction field 1110, for example, either (1) a detailed mode setting instruction or (2) a normal mode setting instruction is set. In addition, (3) an instruction to change from the normal mode to the detailed mode, (4) an instruction to change from the detailed mode to the normal mode, and the like may be added. The information type field 1115 sets the information type. After the mode is changed, the data to be acquired by the terminal apparatus 200 may be designated. Examples of the information type include heart rate, electrocardiogram information, body temperature information, and the like. More specifically, information designating the sensor 225 may be used. The acquisition interval field 1120 sets the data acquisition interval after the mode is changed. That is, the interval detected by the sensor 225 may be set. In the case of the detailed mode setting instructions to the detailed mode, the interval is generally shorter than in the normal mode. The transmission interval field 1125 sets an interval for transmitting data to the information management apparatus 300 after the mode is changed. In the case of the detailed mode setting instructions to the detailed mode, the interval is generally shorter than in the normal mode. In the present exemplary embodiment, the relay device ID field 1130 sets information (specifically, relay device ID) for uniquely identifying the relay device. That is, in the case of the detailed mode setting instruction, the terminal apparatus 200 designates the relay device 100 to perform the near field communication 155. The information management apparatus address field 1135 sets the address of the information management apparatus 300. Specifically, the URL of the information management apparatus 300 is set, in a case of the detailed mode setting instruction (more precisely, in a case where communication using the Internet 360 is performed). This address is the transmission destination of the transmission data 600 or transmission data 1200 to be described later.

The terminal apparatus 200 that has received the instruction to change from the normal mode to the detailed mode transmits transmission data 1200 to the information management apparatus 300 via the near field communication 155, the relay device 100, and the Internet 360. That is, transmission data 1200 having a larger data amount than the transmission data 600 transmitted in the normal mode is transmitted.

Figure 12:
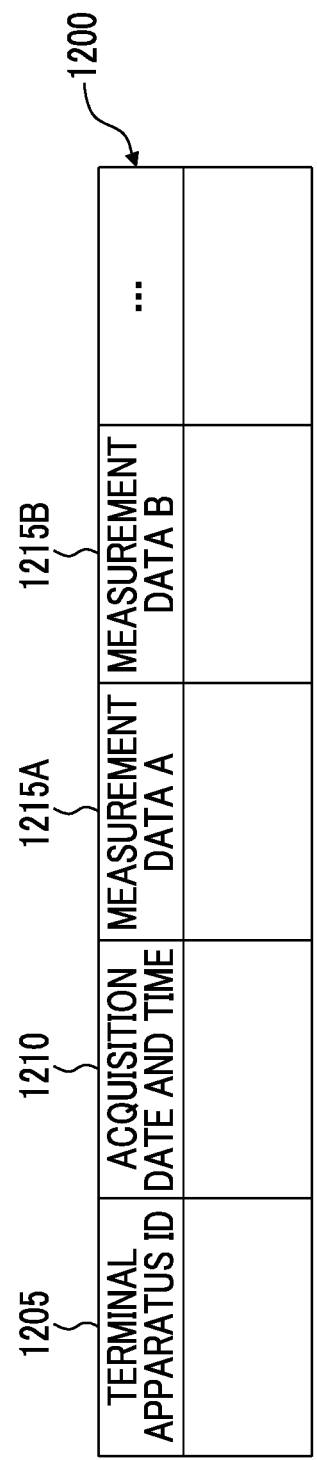
FIG. 12 is a diagram illustrating a data structure example of transmission data.

FIG. 12 is an explanatory diagram showing a data structure example of the transmission data 1200. The transmission data 1200 includes a terminal apparatus ID field 1205, a data acquisition date and time field 1210, a measurement data A field 1215A, a measurement data B field 1215B, and the like. The terminal apparatus ID field 1205 stores the terminal apparatus ID. The acquisition date and time field 1210 stores the date and time when the data is measured. The measurement data A field 1215A stores, for example, measurement data A measured by the sensor 225*a*. The measurement data B field 1215B stores, for example, measurement data B measured by the sensor 225*b*. That is, data of the type designated in the information type field 1115 of the instruction information table 1100 is transmitted. The acquisition date and time field 1210 may be provided for each individual measurement data.

Figure 13:
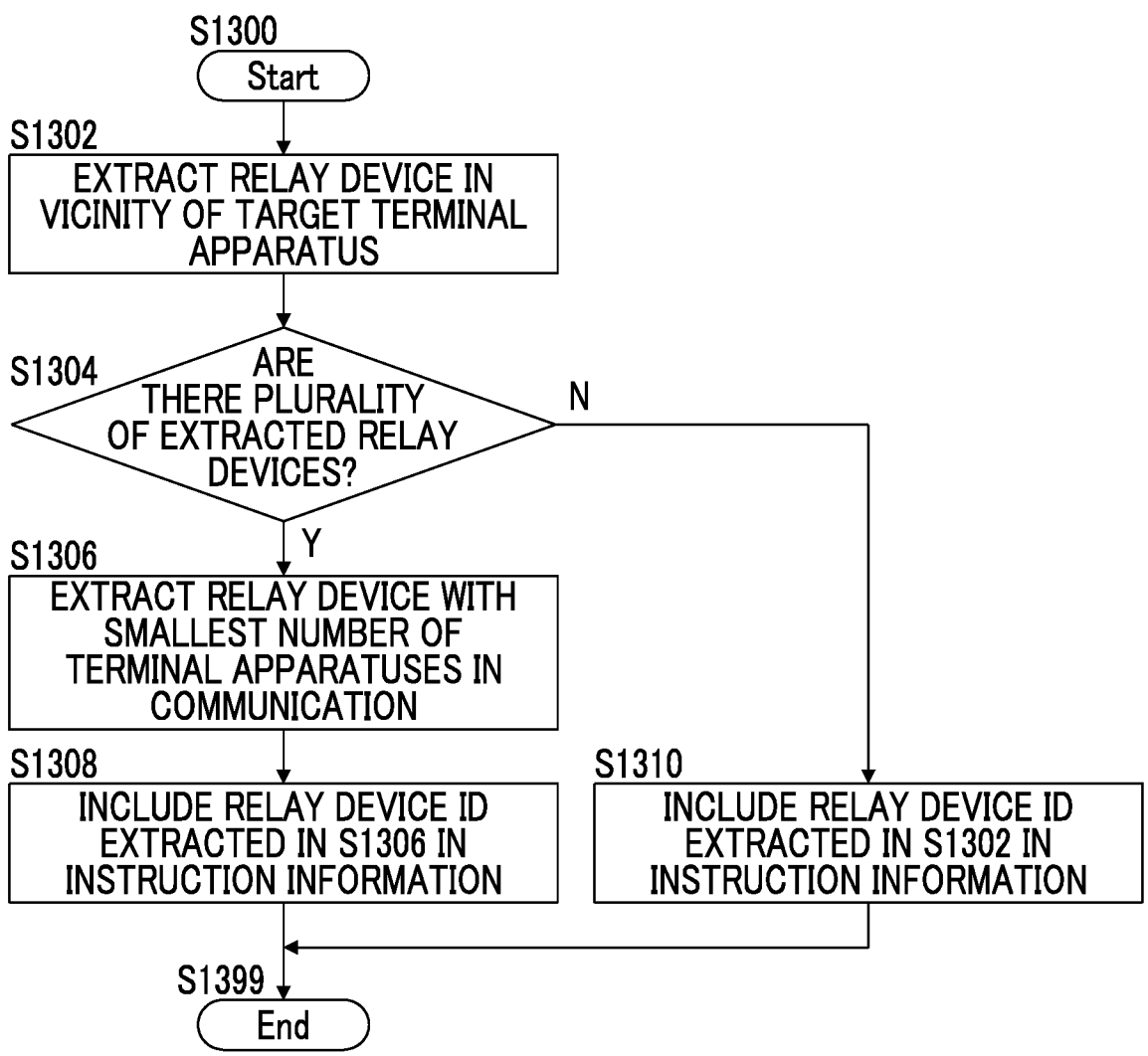
FIG. 13 is a flowchart illustrating a process example according to the present exemplary embodiment.

FIG. 13 is a flowchart illustrating a process example according to the present exemplary embodiment. The example of a process that the information management apparatus 300 performs is shown. Specifically, a setting process example of the relay device ID field 1130 of the instruction information table 1100 is shown.

In step S1302, the relay device 100 in the vicinity of the target terminal apparatus 200 is extracted. The relay device 100 may be extracted using the terminal apparatus-position correspondence table 900 and the relay device-position correspondence table 1400.

In step S1304, it is determined whether there are a plurality of extracted relay devices 100. In a case where there are a plurality of relay devices 100, the process proceeds to step S1306. Otherwise, the process proceeds to step S1310.

In step S1306, the relay device 100 with the smallest number of terminal apparatuses 200 in communication is extracted. The extraction is performed for designating the relay device 100 with a low load of relay processing. Specifically, the extraction may be performed using the relay device-terminal apparatus pair management table 1500.

In step S1308, the relay device ID of relay device 100 extracted in step S1306 is included in the instruction information.

In step S1310, the relay device ID of relay device 100 extracted in step S1302 is included in the instruction information.

In steps S1308 and S1310, specifically, the relay device ID may be set in the relay device ID field 1130 of the instruction information table 1100.

Figure 14:
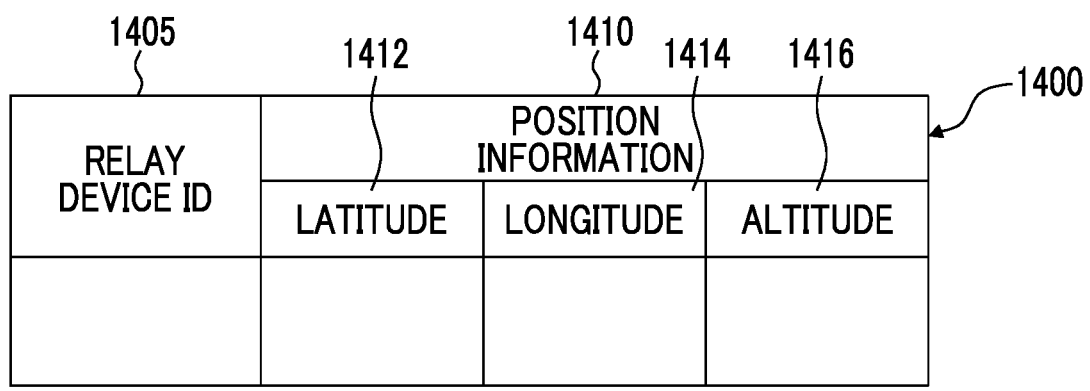
FIG. 14 is an explanatory diagram showing a data structure example of a relay device-position correspondence table.

The information management apparatus 300 stores, for example, a relay device-position correspondence table 1400. FIG. 14 is an explanatory diagram showing a data structure example of the relay device-position correspondence table 1400. The relay device 100 is also managed using a table similar to the terminal apparatus-position correspondence table 900. Specifically, the terminal apparatus ID field 905 of the terminal apparatus-position correspondence table 900 is set as the relay device ID.

The relay device-position correspondence table 1400 includes a relay device ID field 1405 and a position information field 1410. The position information field 1410 includes a latitude field 1412, a longitude field 1414, and an altitude field 1416. The relay device ID field 1405 stores the relay device ID. The position information field 1410 stores position information of the relay device 100. The latitude field 1412 stores latitude. The longitude field 1414 stores longitude. The altitude field 1416 stores the altitude. Since the relay device 100 is often fixed, the relay device-position correspondence table 1400 may be generated when the relay device 100 is installed.

In step S1306, the relay device-terminal apparatus pair management table 1500 is used to extract the number of terminal apparatuses 200 that are communicating. The information management apparatus 300 also stores the relay device-terminal apparatus pair management table 1500.

Figure 15:
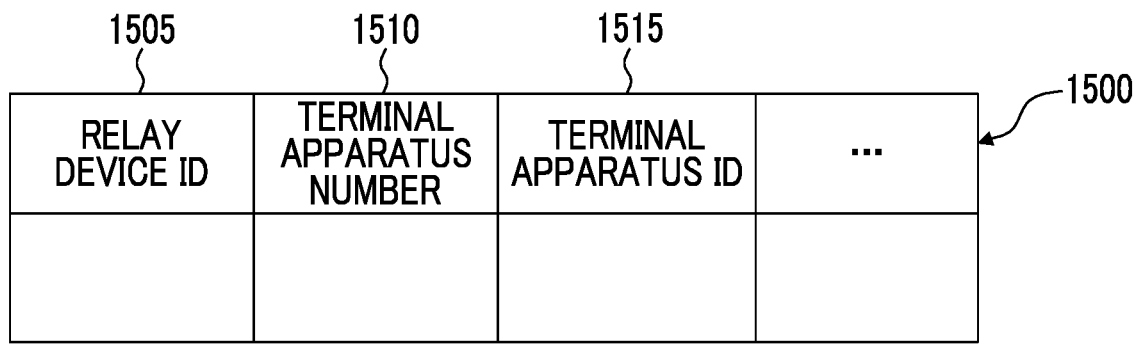
FIG. 15 is an explanatory diagram showing a data structure example of a relay device-terminal apparatus pair management table.

FIG. 15 is an explanatory diagram showing a data structure example of the relay device-terminal apparatus pair management table 1500. The relay device-terminal apparatus pair management table 1500 has a relay device ID field 1505, a terminal apparatus number field 1510, a terminal apparatus ID field 1515, and the like. The relay device ID field 1505 stores the relay device ID of the relay device 100. The terminal apparatus number field 1510 stores the number of terminal apparatuses 200 connected to the relay device 100 by the near field communication 155. The terminal apparatus ID field 1515 stores the terminal apparatus ID of the terminal apparatus 200 connected to the relay device 100.

Figure 16:
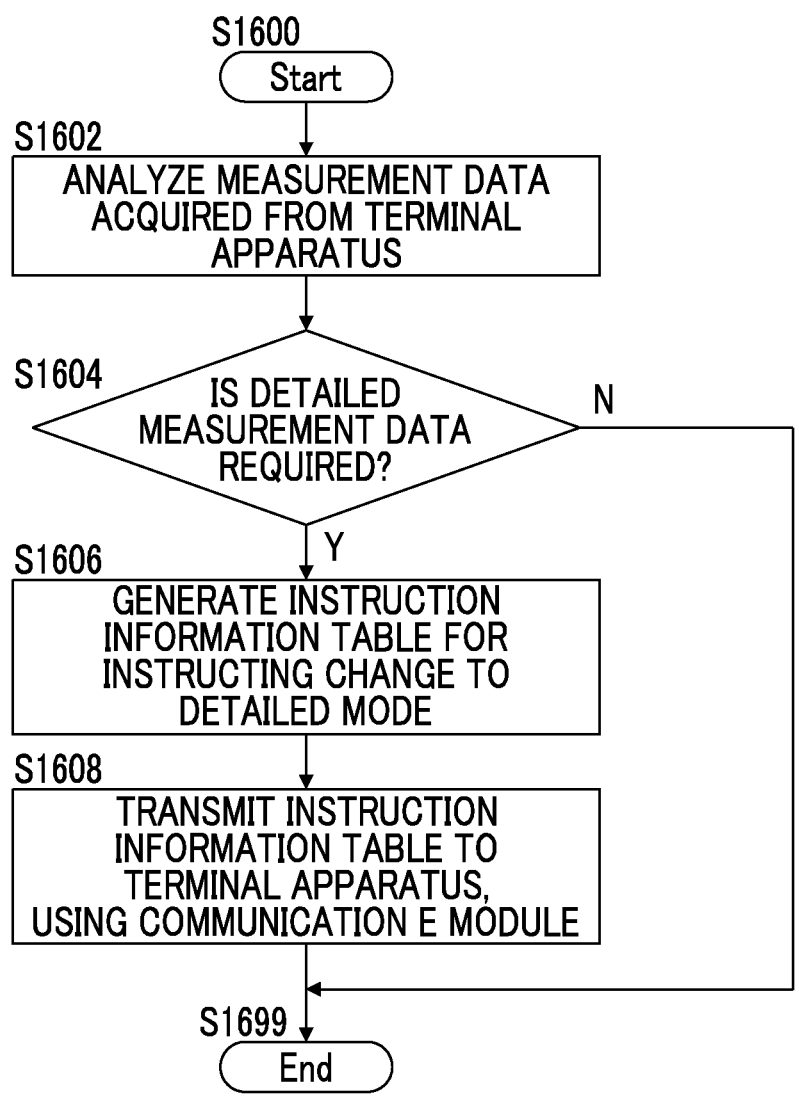
FIG. 16 is a flowchart illustrating a process example according to the present exemplary embodiment.

FIG. 16 is a flowchart illustrating a process example according to the present exemplary embodiment. A process example in a case where the information management apparatus 300 sets the detailed mode for the terminal apparatus 200 is shown.

In step S1602, the measurement data acquired from the terminal apparatus 200 is analyzed. For example, the health state (including physical condition or the like) of the user 400 wearing the terminal apparatus 200 is analyzed.

In step S1604, it is determined whether detailed measurement data is necessary. In a case where it is necessary, the process proceeds to step S1606, and otherwise, the process ends (step S1699). For example, in a case where it is detected that the health state of the user 400 is highly likely to change or the physical condition has suddenly changed, it is determined that detailed measurement data is required, and the process proceeds to step S1606.

In step S1606, the instruction information table 1100 for instructing the change to the detailed mode is generated. Specifically, the information management apparatus 300 sets an instruction to change from the normal mode to the detailed mode in the instruction field 1110 of the instruction information table 1100. In addition, the information type field 1115 and the like are set.

In step S1608, the instruction information table 1100 is transmitted to the terminal apparatus 200, using the communication E module 305.

For example, the following processing is performed as processing of steps S1602 and S1604.

(1) In a case where the measurement data acquired from the terminal apparatus 200 is an abnormal value from the comparison with a predetermined threshold, it is determined that detailed measurement data is required.

(2) In a case where the time-series measurement data group acquired from the terminal apparatus 200 has an abnormal pattern from the comparison with a predetermined pattern, it is determined that detailed measurement data is required.

(3) In a case where the transmission amount of the terminal apparatus 200 is acquired, and the transmission amount is greater than or equal to a predetermined threshold, it is determined that detailed measurement data is required. This is mainly intended to change the communication method.

Figure 17:
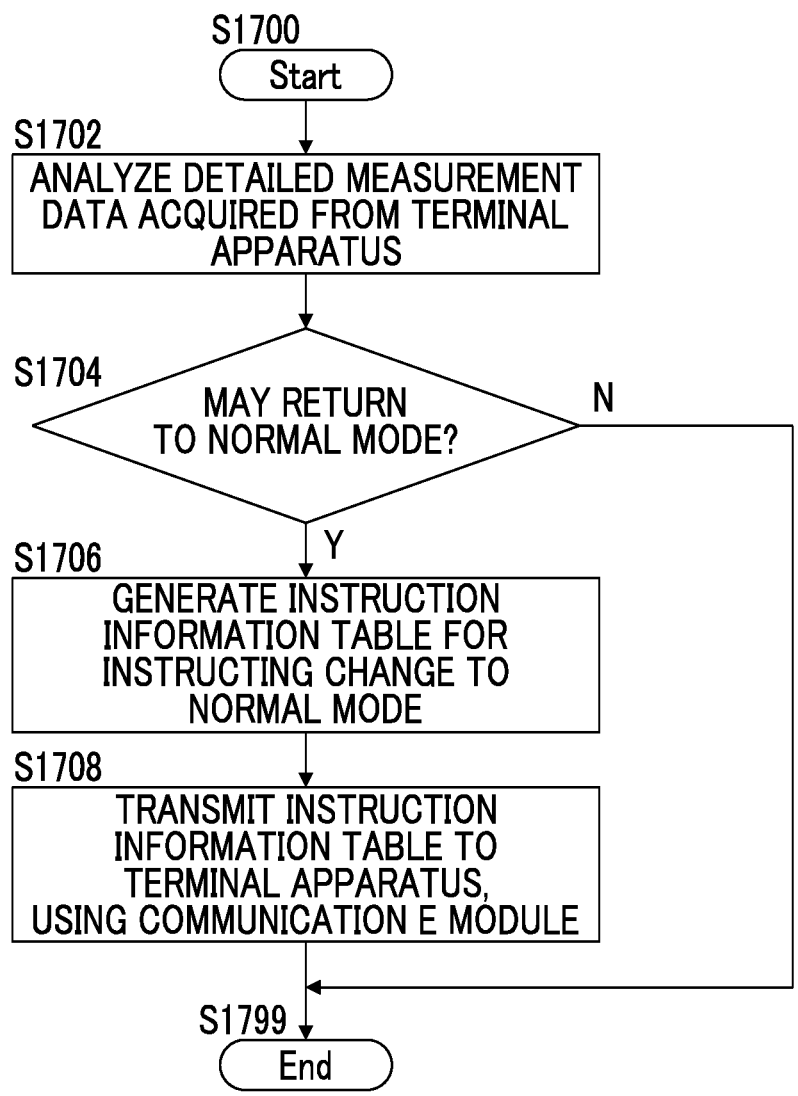
FIG. 17 is a flowchart illustrating a process example according to the present exemplary embodiment.

FIG. 17 is a flowchart illustrating a process example according to the present exemplary embodiment. A process example in a case where the information management apparatus 300 sets the terminal apparatus 200 to the normal mode is shown. The example of a processing for the terminal apparatus 200 which is in the detailed mode is shown.

In step S1702, the detailed measurement data acquired from the terminal apparatus 200 is analyzed.

In step S1704, it is determined whether or not the process may return to the normal mode. In a case where the process may be returned, the process proceeds to step S1706, and otherwise, the process ends (step S1799).

In step S1706, the instruction information table 1100 for instructing the change to the normal mode is generated. Specifically, the information management apparatus 300 sets an instruction to change from the detailed mode to the normal mode in the instruction field 1110 of the instruction information table 1100. In addition, the information type field 1115 and the like may be set. In a case of an instruction to change to the normal mode, it may be returned to the initial state (so-called initialization).

In step S1708, the instruction information table 1100 is transmitted to the terminal apparatus 200, using the communication E module 305.

Figure 18B:
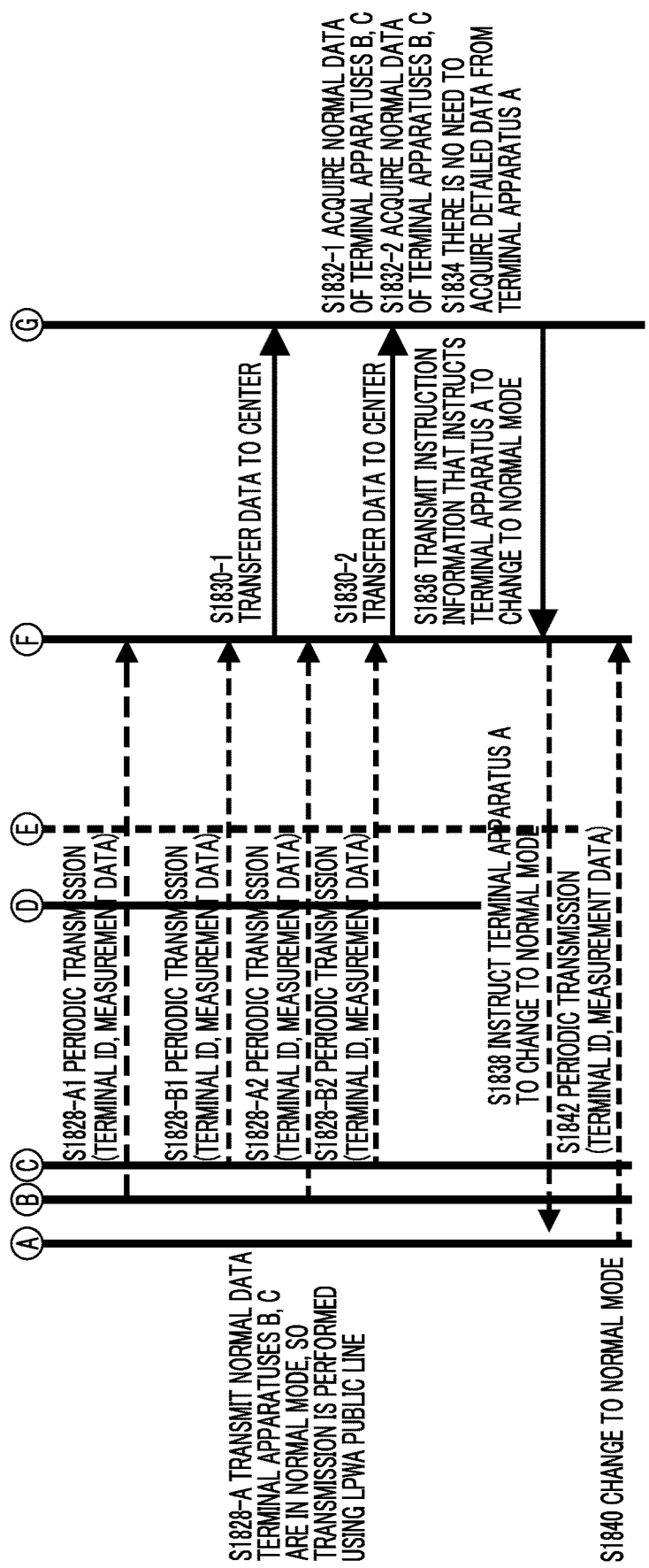

FIGS. 18A and 18B are flowcharts illustrating a process example (2) according to the present exemplary embodiment.

In step S1802, the information management apparatus 300 specifies the terminal apparatus A:200A as a monitoring target. That is, the terminal apparatus A: 200A to be set to the detailed mode is determined.

In step S1804, the relay device 100 performs periodic access to the information management apparatus 300 once a day. For example, access is made every morning at a predetermined time.

In step S1806, the relay device 100 acquires detailed mode change information for the terminal apparatus A: 200A.

In step S1808-A, the relay device 100 transmits a beacon to each terminal apparatus 200 every morning.

In step S1808-B, relay device 100 transmits a BLE beacon (ID of the terminal apparatus A: 200A, connection information of the relay device 100). This process is an example of a process for outputting advertisement information including information for identifying the terminal apparatus A: 200A to be set to the second mode.

In step S1810, each terminal apparatus 200 detects a beacon.

In step S1812, the terminal apparatus A: 200A requests connection to the relay device 100. That is, in a case where the terminal apparatus A: 200A detects that the beacon received from the relay device 100 includes the identification information of the terminal apparatus A: 200A, the terminal apparatus A: 200A requests a connection to the relay device 100.

In step S1814-A, near field communication connection is performed between the terminal apparatus A: 200A and the relay device 100.

In step S1814-B, a near field communication connection is established between the terminal apparatus A: 200A and the relay device 100.

In step S1814-C, the relay device 100 establishes a near field communication connection with the terminal apparatus A: 200A.

In step S1816-A, the relay device 100 determines to transmit an instruction to change to the detailed mode to the terminal apparatus A: 200A.

In step S1816-B, the relay device 100 transmits an instruction to change to the detailed mode to the terminal apparatus A: 200A.

In step S1818, the terminal apparatus A: 200A receives the instruction to change to the detailed mode, and changes to the detailed mode.

In step S1820, each terminal apparatus 200 acquires biological data (heart rate/body temperature/ . . . ). However, the terminal apparatus A: 200A in the detailed mode acquires detailed data, and the terminal apparatus B: 200B and the terminal apparatus C: 200C in the normal mode acquire normal data.

In step S1822-A, the terminal apparatus A: 200A is controlled to transmit the detailed data to the relay device 100.

In step S1822-B, the terminal apparatus A: 200A transmits the detailed data to the relay device 100.

In step S1824, the relay device 100 transmits the detailed data to the information management apparatus 300 using the Internet.

In step S1826, the information management apparatus 300 acquires detailed data from the terminal apparatus A: 200A.

In step S1828-A, the terminal apparatus B: 200B and the terminal apparatus C: 200C transmit normal data to the base station 410. Specifically, the following processing is performed.

In step S1828-A1, the terminal apparatus B: 200B performs periodic transmission (terminal ID of the terminal apparatus B: 200B, measurement data) to the base station 410.

In step S1828-B1, the terminal apparatus C: 200C performs periodic transmission (terminal ID of the terminal apparatus C: 200C, measurement data) to the base station 410.

In step S1828-A2, the terminal apparatus B: 200B performs periodic transmission (terminal ID of the terminal apparatus B: 200B, measurement data) to the base station 410.

In step S1828-B2, the terminal apparatus C: 200C performs periodic transmission (terminal ID of the terminal apparatus C: 2000, measurement data) to the base station 410.

In step S1830-1, the base station 410 transfers data to the information management apparatus 300.

In step S1830-2, the base station 410 transfers data to the information management apparatus 300.

In step S1832-1, the information management apparatus 300 acquires normal data of the terminal apparatus B: 200B and the terminal apparatus C: 200C.

In step S1832-2, the information management apparatus 300 acquires normal data of the terminal apparatus B: 200B and the terminal apparatus C: 200C.

In step S1834, it is determined that there is no need to acquire detailed data from the terminal apparatus A: 200A.

In step S1836, the information management apparatus 300 transmits to the base station 410, instruction information that instructs the terminal apparatus A: 200A to change to the normal mode.

In step S1838, the base station 410 transmits an instruction that instructs the terminal apparatus A: 200A to change to the normal mode.

In step S1840, the terminal apparatus A: 200A receives the instruction to change to the normal mode, and changes to the normal mode.

In step S1842, the terminal apparatus A: 200A performs periodic transmission (terminal ID of the terminal apparatus A: 200A, measurement data) to the base station 410.

Figure 19A:
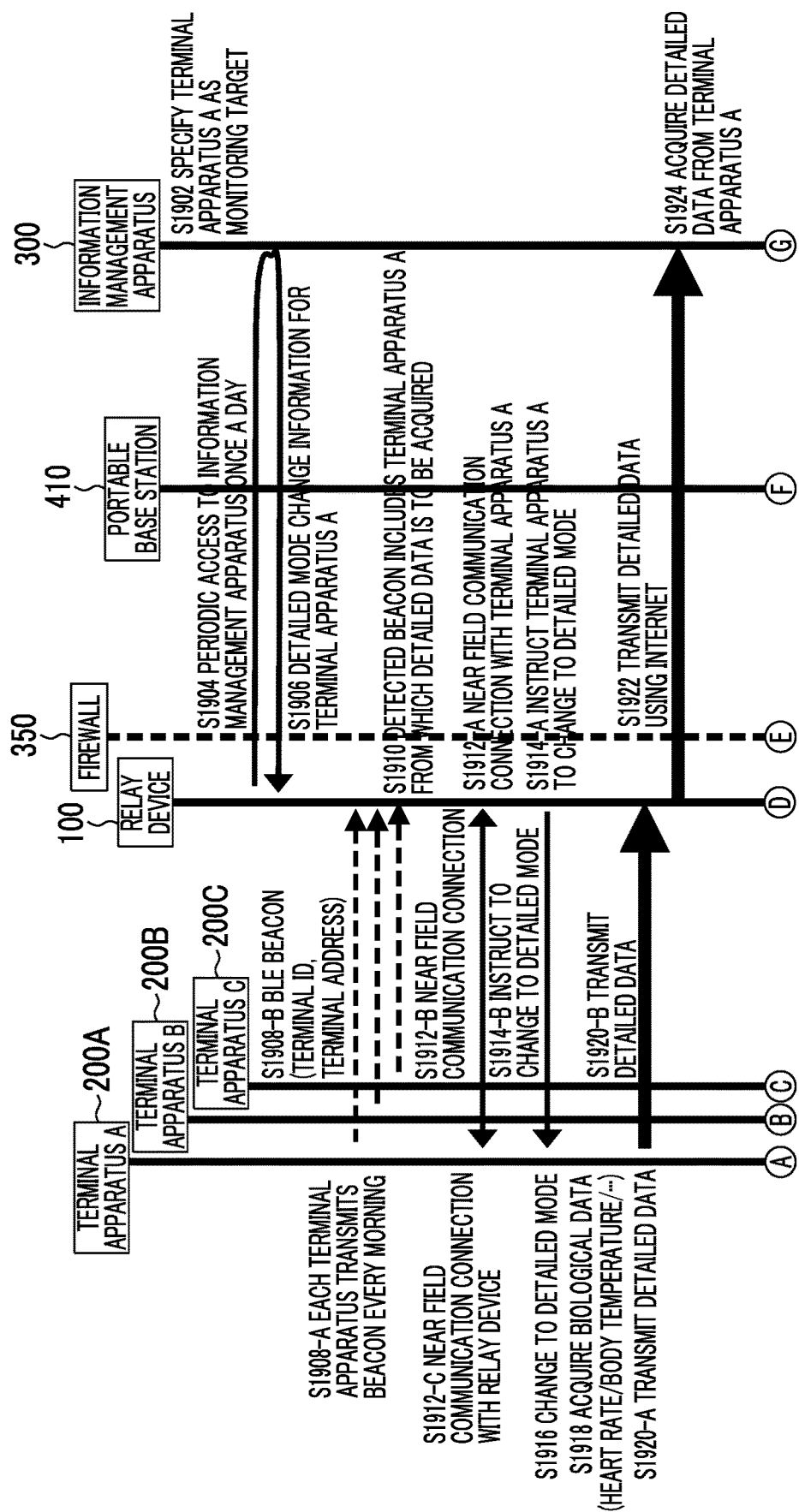
FIGS. 19A and 19B are flowcharts illustrating a process example (3) according to the present exemplary embodiment.
Figure 19B:
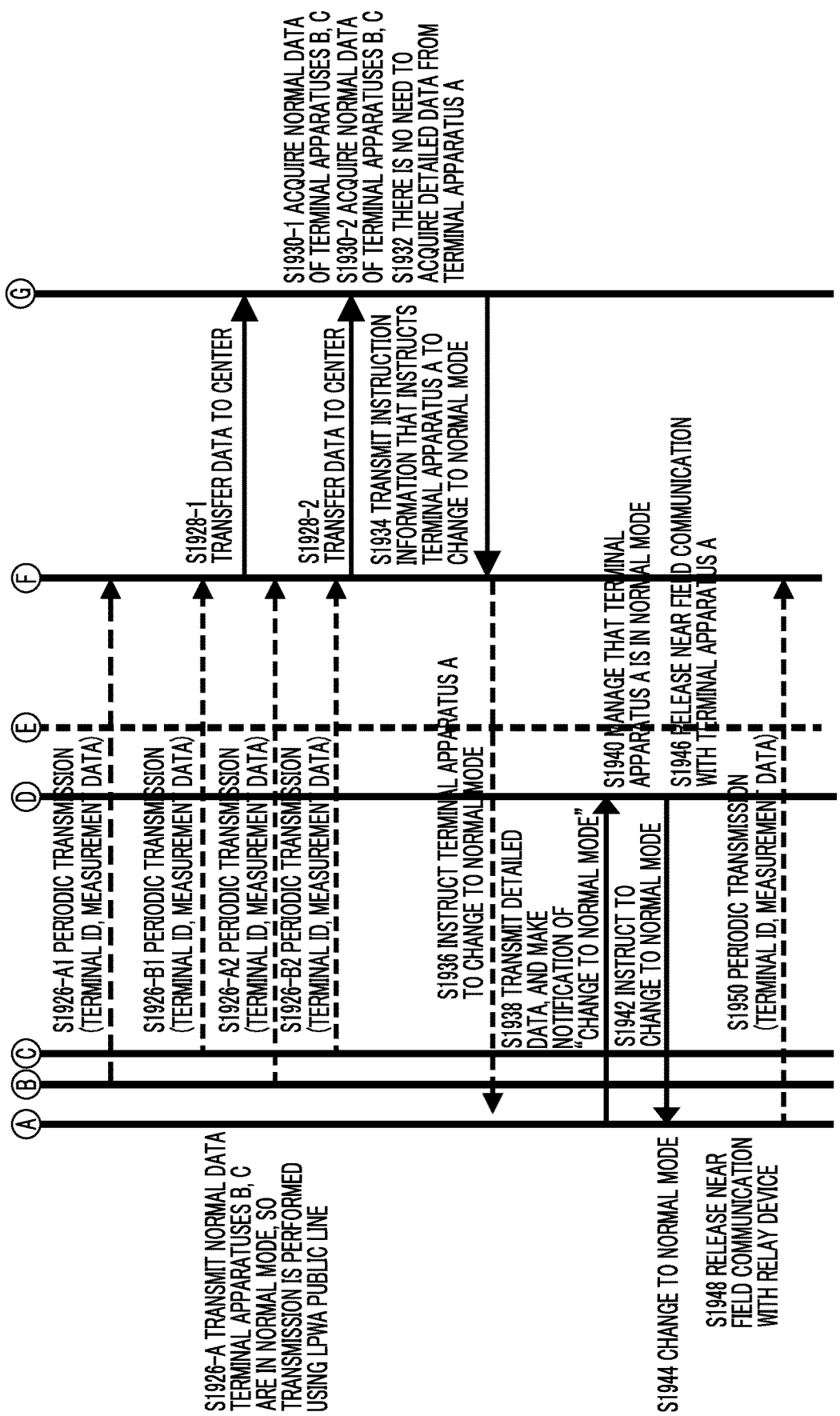

FIGS. 19A and 19B are flowcharts illustrating a process example (3) according to the present exemplary embodiment.

In step S1902, the information management apparatus 300 specifies the terminal apparatus A: 200A as a monitoring target. That is, the terminal apparatus A: 200A to be set to the detailed mode is determined.

In step S1904, the relay device 100 performs periodic access to the information management apparatus 300 once a day. For example, access is made every morning at a predetermined time.

In step S1906, the relay device 100 acquires detailed mode change information for the terminal apparatus A: 200A.

In step S1908-A, each terminal apparatus 200 transmits a beacon every morning.

In step S1908-B, each terminal apparatus 200 transmits a BLE beacon (terminal ID and terminal address of each terminal apparatus 200) to the relay device 100.

In step S1910, the relay device 100 detects that the detected beacon includes the terminal apparatus A: 200A from which detailed data is to be acquired (to be set to the second mode).

In step S1912-A, the relay device 100 establishes a near field communication connection with the terminal apparatus A: 200A.

In step S1912-B, near field communication connection is performed between the terminal apparatus A: 200A and the relay device 100.

In step S1912-C, near field communication connection is performed between the terminal apparatus A: 200A and the relay device 100.

In step S1914-A, the relay device 100 determines to transmit an instruction to change to the detailed mode to the terminal apparatus A: 200A.

In step S1914-B, the relay device 100 transmits an instruction to change to the detailed mode to the terminal apparatus A: 200A.

In step S1916, the terminal apparatus A: 200A receives the instruction to change to the detailed mode, and changes to the detailed mode.

In step S1918, each terminal apparatus 200 acquires biological data (heart rate/body temperature/ . . . ). However, the terminal apparatus A: 200A in the detailed mode acquires detailed data, and the terminal apparatus B: 200B and the terminal apparatus C: 200C in the normal mode acquire normal data.

In step S1920-A, the terminal apparatus A: 200A is controlled to transmit the detailed data to the relay device 100.

In step S1920-B, the terminal apparatus A: 200A transmits the detailed data to the relay device 100.

In step S1922, the relay device 100 transmits the detailed data to the information management apparatus 300 using the Internet.

In step S1924, the information management apparatus 300 acquires detailed data from the terminal apparatus A: 200A.

In step S1926-A, the terminal apparatus B: 200B and the terminal apparatus C: 200C transmit normal data to the base station 410. Specifically, the following processing is performed.

In step S1926-A1, the terminal apparatus B: 200B performs periodic transmission (terminal ID of the terminal apparatus B: 200B, measurement data) to the base station 410.

In step S1926-B1, the terminal apparatus C: 200C performs periodic transmission (terminal ID of the terminal apparatus C: 200C, measurement data) to the base station 410.

In step S1926-A2, the terminal apparatus B: 200B performs periodic transmission (terminal ID of the terminal apparatus B: 200B, measurement data) to the base station 410.

In step S1926-B2, the terminal apparatus C: 200C performs periodic transmission (terminal ID of the terminal apparatus C: 200C, measurement data) to the base station 410.

In step S1928-1, the base station 410 transfers data to the information management apparatus 300.

In step S1928-2, the base station 410 transfers data to the information management apparatus 300.

In step S1930-1, the information management apparatus 300 acquires normal data of the terminal apparatus B: 200B and the terminal apparatus C: 200C.

In step S1930-2, the information management apparatus 300 acquires normal data of the terminal apparatus B: 200B and the terminal apparatus C: 200C.

In step S1932, it is determined that there is no need to acquire detailed data from the terminal apparatus A: 200A.

In step S1934, the information management apparatus 300 transmits to the base station 410, instruction information that instructs the terminal apparatus A: 200A to change to the normal mode.

In step S1936, the base station 410 transmits an instruction that instructs the terminal apparatus A: 200A to change to the normal mode.

In step S1938, the terminal apparatus A: 200A transmits detailed data to the relay device 100, and makes a notification of "change to normal mode". The detailed data to be transmitted here is detailed data measured after transmitting the previous detailed data.

In step S1940, the relay device 100 manages that the terminal apparatus A: 200A is in the normal mode.

In step S1942, the relay device 100 transmits an instruction to change to the normal mode to the terminal apparatus A: 200A. Note that step S1942 may not be required. In that case, the terminal apparatus A: 200A may perform the process of step S1944 in accordance with the "instruction to change to the normal mode" in step S1936.

In step S1944, the terminal apparatus A: 200A receives the instruction to change to the normal mode, and changes to the normal mode.

In step S1946, the relay device 100 releases the near field communication with the terminal apparatus A: 200A.

In step S1948, the terminal apparatus A: 200A releases the near field communication with the relay device 100.

In step S1950, the terminal apparatus A: 200A performs periodic transmission (terminal ID of the terminal apparatus A: 200A, measurement data) to the base station 410.

Figure 20:
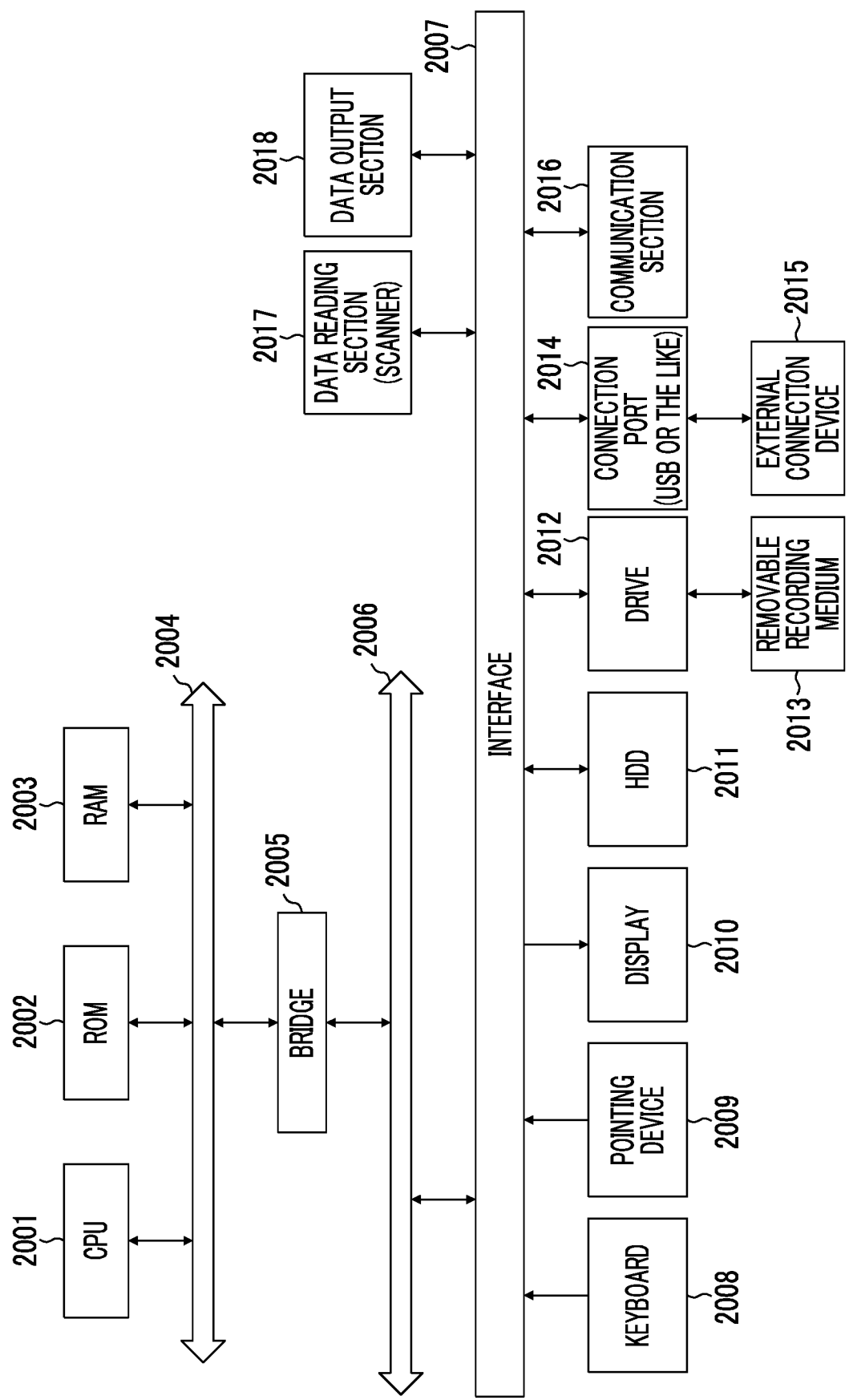
FIG. 20 is a block diagram illustrating a hardware configuration example of a computer realizing the present exemplary embodiment.

A hardware configuration example of the relay device 100 according to the present exemplary embodiment will be described with reference to FIG. 20. The configuration shown in FIG. 20 is, for example, the configuration of a personal computer or the like, and shows an example of a hardware configuration including a data reading section 2017 such as a scanner and a data output section 2018 such as a printer.

A central processing unit (CPU) 2001 is a control section that executes a process according to the computer program describing the execution sequence of various modules described in the above-described exemplary embodiment, that is, the communication A module 105, the communication B module 110, the control module 120, and the like for performing the function as the relay device 100.

A read only memory (ROM) 2002 stores programs, operation parameters, and the like used by the CPU 2001. A random access memory (RAM) 2003 stores programs to be used in the execution of the CPU 2001, parameters appropriately changed in the execution thereof, and the like. These are mutually connected by host bus 2004 which is a CPU bus or the like.

The host bus 2004 is connected to an external bus 2006 such as a peripheral component interconnect/interface (PCI) bus, via a bridge 2005.

A keyboard 2008 and a pointing device 2009 such as a mouse are devices operated by an operator. A display 2010 is a liquid crystal display device or a CRT (abbreviation of cathode ray tube) and the like, and displays various types of information as text or image information. It may be a touch screen or the like having both functions of a pointing device 2009 and a display 2010. In that case, with respect to realization of the function of the keyboard, the function of the keyboard may be realized by drawing keyboard (so-called software keyboard, screen keyboard or the like) by software on the screen (for example, touch screen) without physical connection as the keyboard 2008.

A hard disk drive (HDD) 2011 incorporates a hard disk (which may be a flash memory or the like in addition to the hard disk), drives the hard disk, and records or plays back programs and information to be executed by CPU 2001. It has a function as the storage module 115, and stores various data for communication, various computer programs, and the like.

The drive 2012 reads data or a program recorded on the removable recording medium 2013 such as amounted magnetic disk, optical disk, magneto-optical disk, semiconductor memory or the like, and transmits the data or program to the RAM 2003 connected via the interface 2007, the external bus 2006, the bridge 2005, and the host bus 2004. A removable recording medium 2013 can also be used as a data recording area.

The connection port 2014 is a port to which the external connection device 2015 is connected, and has a connection portion such as USB and IEEE 1394. The connection port 2014 is connected to the CPU 2001 and the like via the interface 2007, the external bus 2006, the bridge 2005, the host bus 2004, and the like. The communication section 2016 is connected to a communication line and executes a data communication process with the outside. Specifically, pair establishment and communication by the near field communication 155 with the terminal apparatus 200, and communication with the information management apparatus 300 via the Internet 360 are performed. The data reading section 2017 is, for example, a scanner, and executes a document reading process. The data output section 2018 is, for example, a printer, and executes a document data output process.

Figure 21:
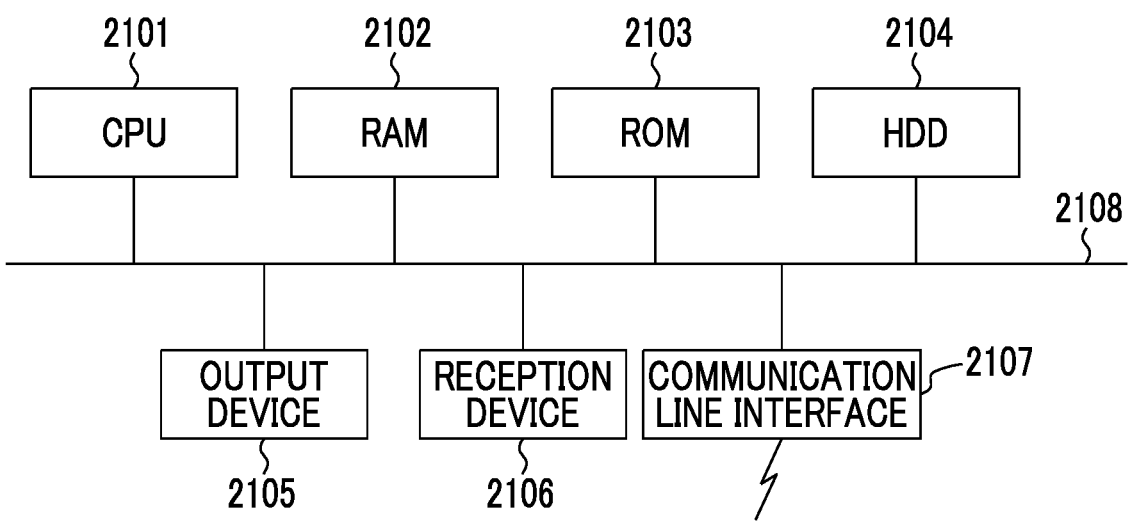
FIG. 21 is a block diagram illustrating a hardware configuration example of a computer realizing the present exemplary embodiment.

As illustrated in FIG. 21, the hardware configuration of the computer on which the program as the terminal apparatus 200 and the information management apparatus 300 which are the present exemplary embodiment is executed is a general computer, specifically, a computer that can be a personal computer, a server, or the like. In other words, as a specific example, a CPU 2101 is used as a processing unit (calculation unit), and a RAM 2102, a ROM 2103, and an HDD 2104 are used as a storage device. As the HDD 2104, for example, an HDD (abbreviation for Hard Disk Drive), an SSD (abbreviation for a solid state drive) that is a flash memory, or the like may be used. The computer includes the CPU 2101 executing programs for the communication C module 205, the communication D module 210, the data acquisition C module 215, the data acquisition D module 220, the control module 230, the communication E module 305, the communication F module 310, the data acquisition E module 315, the data acquisition F module 320, the storage control module 325, and the instruction transmission module 335, the RAM 2102 storing the programs or data, the ROM 2103 storing a program or the like for activating the computer, the HDD 2104 which is an auxiliary storage device having a function as the storage module 330 or the like, a reception device 2106 that receives data based on an operation (including an action, a voice, a line of vision, and the like) of the user on a keyboard, a mouse, a touch screen, a microphone, or a camera (including a visual line detection camera or the like), an output device 2105 such as a CRT, a liquid crystal display, or a speaker, a communication line interface 2107 for a connection to a communication network, such as a network interface card, and a bus 2108 connecting the above-described components to each other in order to transmit and receive data. Such a plurality of computers may be connected to each other via a network.

Among the above-described exemplary embodiments, in a case of the embodiment based on a computer program, the computer program which is software is read to a system having the present hardware configuration, and the exemplary embodiment is realized via cooperation between the software and the hardware resources.

The hardware configuration illustrated in FIGS. 20 and 21 corresponds to one configuration example, and the present exemplary embodiment is not limited to the configuration illustrated in FIGS. 20 and 21, and any configuration in which the modules described in the present exemplary embodiment can be executed may be used. For example, some of the modules may be configured with dedicated hardware (for example, an application specific integrated circuit (ASIC) or a field-programmable gate array (FPGA)), some of the modules may be provided in an external system, and may be connected to a communication line, and such a plurality of systems illustrated in FIGS. 20 and 21 may be connected to each other via a communication line so as to operate in cooperation therebetween. Further, in addition to personal computers, in particular, it may be cooperated into portable information communication devices (including mobile phones, smartphones, mobile devices, wearable computers, or the like), information appliances, robots, copiers, faxes, scanners, printers, multifunction peripherals, and the like.

The program may be stored on a recording medium so as to be provided, and the program may be provided by using communication means. In this case, for example, the program may be understood as the invention of a "non-transitory computer readable medium storing the program".

The "non-transitory computer readable medium storing the program" indicates a computer readable recording medium storing the program, used to install, execute, and distribute the program.

Examples of the recording medium include a digital versatile disk (DVD) ("DVD-R, DVD-RW, DVD-RAM, or the like" which is a standard defined by a DVD forum and "DVD+R, DVD+RW, or the like" which is a standard defined by DVD+RW), a compact disc (CD) (a read-only memory (CD-ROM), a CD recordable (CD-R), a CD rewritable (CD-RW), or the like), a Blu-ray (registered trademark) Disc, a magneto-optical disk (MO), a flexible disk (FD), a magnetic tape, a hard disk, a read only memory (ROM), an electrically erasable and rewri table read only memory (EEPROM (registered trademark)), a flash memory, a random access memory (RAM), a secure digital (SD) memory card, or the like.

The whole or a part of the program may be recorded on the recording medium so as to be preserved or distributed. The program may be transmitted via communication, for example, by using a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be a part of the whole of another program, or may be recorded on a recording medium along with a separate program. The program may be divided and recorded on a plurality of recording media. The program may be recorded in any restorable aspect such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay device comprising:
    a first communication unit that communicates with an information management apparatus connected to the Internet via a firewall;
    a second communication unit that performs near field communication with a terminal apparatus;
    a storage unit that acquires from the information management apparatus, using the first communication unit, information for identifying the terminal apparatus and mode instruction information that is instruction information indicating that an operation is to be performed in a second mode for acquiring data having a larger data amount than in a first mode, and stores the acquired information; and
    a control unit that in a case where the terminal apparatus connected using the second communication unit is a terminal apparatus that needs to operate in the second mode, performs control so as to transmit mode instruction information for instructing the operation in the second mode, to the terminal apparatus, and transmit data acquired from the terminal apparatus by using the second communication unit, to the information management apparatus by using the first communication unit.

2. The relay device according to claim 1,
    wherein the second communication unit outputs advertisement information including information for identifying the terminal apparatus stored in the storage unit, and in a case where a connection request is received from the terminal apparatus corresponding to the identification information, the second communication unit establishes a connection with the terminal apparatus.

3. The relay device according to claim 1,
    wherein the second communication unit receives advertisement information output from the terminal apparatus, and in a case where the received advertisement information includes information for identifying the terminal apparatus stored in the storage unit, the second communication unit establishes a connection with the terminal apparatus.

4. The relay device according to claim 2,
    wherein the advertisement information includes connection information for communication connection, and a connection with the terminal apparatus is established using the connection information.

5. The relay device according to claim 3,
    wherein the advertisement information includes connection information for communication connection, and a connection with the terminal apparatus is established using the connection information.

6. The relay device according to claim 4,
    wherein the connection information includes at least one of address information or passcode information.

7. The relay device according to claim 5,
    wherein the connection information includes at least one of address information or passcode information.

8. The relay device according to claim 1,
    wherein in a case where the information acquired from the information management apparatus does not include the identification information of the terminal apparatus from which detailed data stored in the storage unit is to be acquired, the relay device transmits to the terminal apparatus, mode instruction information which is instruction information indicating that an operation is to be performed in the first mode, and releases a connection with the terminal apparatus using the second communication unit.

9. The relay device according to claim 1,
    wherein in a case where the information acquired from the terminal apparatus includes the information indicating that transmission in the second mode is not required, a connection with the terminal apparatus using the second communication unit is released.

10. The relay device according to claim 9,
    wherein the relay device further transmits, to the terminal apparatus, mode instruction information that is instruction information indicating that an operation is to be performed in the first mode.

11. The relay device according to claim 9,
    wherein the information indicating that transmission in the second mode is not required is information transmitted by communication from the information management apparatus to the terminal apparatus, which is neither communication by the first communication unit nor near field communication by the second communication unit, from the information management apparatus to the terminal apparatus.

12. The relay device according to claim 1,
    wherein in a case where advertisement information output from the terminal apparatus is received, and the advertisement information does not include the information for identifying the terminal apparatus stored in the storage unit, the relay device establishes a connection by using the second communication unit, transmits mode instruction information which is instruction information indicating that an operation is to be performed in the first mode to the terminal apparatus, and thereafter releases the connection with the terminal apparatus using the second communication unit.

13. The relay device according to claim 1,
    wherein the control unit communicates with the information management apparatus at periodic times using the first communication unit, acquires the information for identifying the terminal apparatus and the mode instruction information from the information management apparatus, and stores the acquired information in the storage unit.

14. The relay device according to claim 13,
    wherein the control unit performs control so as to perform the periodic communication before the near field communication is performed with the terminal apparatus.

15. An information processing system comprising:
    a relay device; and
    a terminal apparatus,
    wherein the relay device includes a first communication unit that communicates with an information management apparatus connected to the Internet via a firewall;

a second communication unit that performs near field communication with the terminal apparatus;

a storage unit that acquires from the information management apparatus, using the first communication unit, information for identifying the terminal apparatus and mode instruction information that is instruction information indicating that an operation is to be performed in a second mode for acquiring data having a larger data amount than in a first mode, and stores the acquired information; and a first control unit that in a case where the terminal apparatus connected using the second communication unit is a terminal apparatus that needs to operate in the second mode, performs control so as to transmit mode instruction information for instructing the operation in the second mode, to the terminal apparatus, and transmit data acquired from the terminal apparatus by using the second communication unit, to the information management apparatus by using the first communication unit; and wherein the terminal apparatus includes at least two or more data areas being present in data handled in mobile phone communication between the terminal apparatus and a base station of a mobile phone communication network, a first data area out of the data areas being for a data amount smaller than a data amount of the second data area which is the another data area, and the data acquired by the terminal apparatus being included in the first data area;

a third communication unit that transmits and receives data with the information management apparatus outside the firewall via the base station, by using a communication method in which data is transmitted and received only data in the first data area;

a fourth communication unit that performs near field communication with the relay device within the firewall;

a first data acquisition unit that acquires data;

a second data acquisition unit that acquires data having a larger data amount than the data acquired by the first data acquisition unit; and a second control unit that performs controls such that the data acquired by the first data acquisition unit is transmitted to the information management apparatus by using the third communication unit in a case of the first mode, and the data acquired by the second data acquisition unit is transmitted to the information management apparatus by using the fourth communication unit in a case of the second mode.

16. The information processing system according to claim 15,
wherein in a case where the fourth communication unit receives the mode instruction information from the relay device, the second control unit of the terminal apparatus performs control so as to transmit the data acquired by the second data acquisition unit to the information management apparatus, using the fourth communication unit.

17. The information processing system according to claim 15,
wherein in a case where the third communication unit receives the information indicating that transmission in the second mode is not required, from the information management apparatus, the second control unit of the terminal apparatus performs control so as to transmit the data acquired by the first data acquisition unit to the information management apparatus, using the third communication unit.

18. The information processing apparatus according to claim 17,
wherein in a case where the third communication unit receives the information indicating that transmission in the second mode is not required, from the information management apparatus, the second control unit of the terminal apparatus releases the connection with the relay device using the fourth communication unit.

19. A non-transitory computer readable medium storing a relay processing program for causing a computer to function as:

a first communication unit that communicates with an information management apparatus connected to the Internet via a firewall;

a second communication unit that performs near field communication with the terminal apparatus;

a storage unit that acquires from the information management apparatus, using the first communication unit, information for identifying the terminal apparatus and mode instruction information that is instruction information indicating that an operation is to be performed in a second mode for acquiring data having a larger data amount than in a first mode, and stores the acquired information; and a control unit that in a case where the terminal apparatus connected using the second communication unit is a terminal apparatus that needs to operate in the second mode, performs control so as to transmit mode instruction information for instructing the operation in the second mode, to the terminal apparatus, and transmit data acquired from the terminal apparatus by using the second communication unit, to the information management apparatus by using the first communication unit.

* * * * *